United States Patent
Bly et al.

(10) Patent No.: US 12,271,834 B2
(45) Date of Patent: Apr. 8, 2025

(54) SYSTEMS AND METHODS FOR ORGANIZING, FINDING, AND USING DATA

(71) Applicant: System Inc., Malden on Hudson, NY (US)

(72) Inventors: Adam Bly, New York, NY (US); Mehdi Jamei, Chappaqua, NY (US); David Kang, New York, NY (US); Lisa Strausfeld, Portland, OR (US); Victor Shih, New York, NY (US)

(73) Assignee: System Inc., New York, NY (US)

(*) Notice: Subject to any disclaimer, the term of this patent is extended or adjusted under 35 U.S.C. 154(b) by 340 days.

(21) Appl. No.: 17/983,180

(22) Filed: Nov. 8, 2022

(65) Prior Publication Data

US 2023/0060252 A1    Mar. 2, 2023

Related U.S. Application Data

(63) Continuation-in-part of application No. 17/736,897, filed on May 4, 2022, now abandoned, which is a
(Continued)

(51) Int. Cl.
*G06F 9/44* (2018.01)
*G06F 16/2457* (2019.01)
(Continued)

(52) U.S. Cl.
CPC ......... *G06N 7/01* (2023.01); *G06F 16/24578* (2019.01); *G06F 16/9024* (2019.01);
(Continued)

(58) Field of Classification Search
CPC ...................................................... G06N 7/01
(Continued)

(56) References Cited

U.S. PATENT DOCUMENTS 9,811,438 B1    11/2017   Barrett et al.
9,836,183 B1 *  12/2017   Love ..................... G06F 16/904
(Continued)

FOREIGN PATENT DOCUMENTS

CN    102663016 A    9/2012
JP    2009217724 A   9/2009
JP    2017134582 A   8/2017

OTHER PUBLICATIONS

International Searching Authority; PCT Application No. PCT/US2020/015871 filed Jan. 30, 2020; dated May 1, 2020; pp. 1-10 (2020).
(Continued)

*Primary Examiner* — Timothy A Mudrick
(74) *Attorney, Agent, or Firm* — FisherBroyles LLP; Alan D. Minsk

(57) ABSTRACT

A system and associated methods for organizing, representing, finding, discovering, and using data. Embodiments represent information and data in the form of a data structure termed a Feature Graph, that includes nodes and edges, where the edges serve to connect a node to one or more other nodes. A node in a Feature Graph may represent a variable, such as a measurable object, characteristic, or factor of a study. An edge in a Feature Graph may represent a measure of a statistical association between a node and one or more other nodes. Datasets that demonstrate or support the statistical association or measure the associated variable may be accessed through an identifier in a Feature Graph. An application may traverse a Feature Graph and aggregate and process data associated with a set of nodes or edges.

20 Claims, 12 Drawing Sheets

Related U.S. Application Data continuation of application No. 16/421,249, filed on May 23, 2019, now Pat. No. 11,354,587.

(60) Provisional application No. 62/799,981, filed on Feb. 1, 2019.

(51) Int. Cl.
   *G06F 16/901*   (2019.01)
   *G06F 18/20*    (2023.01)
   *G06F 18/24*    (2023.01)
   *G06N 7/01*     (2023.01)
   *G06N 20/00*    (2019.01)

(52) U.S. Cl.
   CPC ............ *G06F 18/24* (2023.01); *G06F 18/285* (2023.01); *G06N 20/00* (2019.01)

(58) Field of Classification Search
   USPC ............................................. 703/2
   See application file for complete search history.

(56) References Cited

U.S. PATENT DOCUMENTS

| | | |
|---|---|---|
| 2007/0179354 A1 | 8/2007 | Stupp et al. |
| 2012/0089621 A1 | 4/2012 | Liu et al. |
| 2015/0112978 A1 | 4/2015 | Arora |
| 2017/0286866 A1* | 10/2017 | Bhowan ............... G06F 16/9024 |
| 2021/0141831 A1* | 5/2021 | Sherman ........... G06F 16/90335 |

OTHER PUBLICATIONS

European Patent Office; European Extended Search Report dated Feb. 25, 2022; EPO Application No. 20747877.7; pp. 1-12 (2022).

Xu et al.; "Discovering user interest on twitter with a modified author-topic model." In: 2011 IEEE/WIC/ACM International Conferences on Web Intelligence and Intelligent Agent Technology; Aug. 27, 2011; Retrieved on Mar. 29, 2020 from <http://www.nlpr.ia.ac.cn/2011papers/gjhy/ghl01.pdf>; pp. 1-9.

Ye et al.; "Using node identifiers and community prior for graph-based classification." In: Data Science and Engineering; Mar. 16, 2018; Retrieved Mar. 29, 2020; from <https://link.springer.com/content/pdf/10.1007/s41019-018-0062-8.pdf> pp. 1-16.

* cited by examiner

100

300

SYSTEMS AND METHODS FOR ORGANIZING, FINDING, AND USING DATA

CROSS REFERENCE TO RELATED APPLICATIONS

This application is a continuation-in-part of U.S. Non-Provisional application Ser. No. 17/736,897, filed May 4, 2022, which is a continuation of U.S. Non-Provisional application Ser. No. 16/421,249, filed May 23, 2019 (now issued U.S. Pat. No. 11,354,587), which claims the benefit of U.S. Provisional Application No. 62/799,981, entitled "System and Methods for Organizing and Finding Data," filed Feb. 1, 2019, the entire contents of which are incorporated herein for all purposes.

BACKGROUND

Data is used as part of many learning and decision processes, where the data may be related to topics, entities, concepts, or observations, as examples. However, to be useful, the data must be efficiently discovered, accessed, and processed, or otherwise utilized. Further, it is desirable that the data be relevant (or in some cases, sufficiently relevant) to the task being performed or the decision being made. However, making a reliable data-driven decision or prediction requires data not just about the desired outcome of a decision or the target of a prediction, but data about the variables (ideally all, but at least the ones most strongly) statistically associated with that outcome or target. Unfortunately, it is very difficult using conventional approaches to determine which variables have been demonstrated to be statistically associated with an outcome or target and to access data about those variables.

This problem is also present in the case of machine learning (ML), where it is important to identify and construct an appropriate training set for use with a machine learning algorithm to construct a trained model. However, identifying and accessing reliable training data is difficult in large part because of the conventional way in which information and data are organized.

In many situations, discovery of and access to data is made more efficient by representing data in a particular format or structure. The format or structure may include labels for one or more columns, rows, or fields in a data record. Conventional approaches to identifying and discovering data of interest are typically based on semantically matching words with labels in (or referring to or associated with) a dataset. While this method is useful for discovering and accessing data about a topic (such as a target or an outcome, for example) which may be relevant, it does not address the problem of discovering and accessing data about topics that is more reliable than can be obtained from conventional approaches because it is based at least in part on variables that are statistically associated with a topic of interest.

Embodiments of the disclosed system, apparatus, and methods address and solve these and other problems or disadvantages of conventional solutions for organizing, representing, finding, discovering, and accessing data, both individually and collectively. Embodiments are also directed to ways of utilizing the organized data to enable a user to better understand relationships between data and a topic, and between different topics. This can assist a user to investigate relationships between topics that might not appear to be related in the absence of the disclosed approach.

SUMMARY

The terms "invention," "the invention," "this invention," "the present invention," "the present disclosure," or "the disclosure" as used herein are intended to refer broadly to all the subject matter disclosed in this document, the drawings or figures, and to the claims. Statements containing these terms do not limit the subject matter disclosed or the meaning or scope of the claims. Embodiments covered by this disclosure are defined by the claims and not by this summary. This summary is a high-level overview of various aspects of the disclosure and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification, to any or all figures or drawings, and to each claim.

Embodiments of the disclosed system and associated methods are directed to approaches to organizing, representing, finding, discovering, and accessing data. In some embodiments, information and data are represented in the form of a novel data structure termed a "Feature Graph" herein. A Feature Graph is a graph or diagram that includes nodes and edges, where the edges serve to "connect" a node to one or more other nodes. A node in a Feature Graph may represent a topic or a variable, that is, a measurable quantity, object, characteristic, feature, or factor that is relevant to a set of data. An edge in a Feature Graph may represent a measure of a statistical association (typically a statistically relevant one) between a node and one or more other nodes.

The statistical association typically (although in some embodiments, not exclusively) results from performing one or more steps found in the "Scientific Method" approach to an investigation. These are typically described as including steps or stages such as (1) making observations, (2) making conjectures (hypotheses), (3) deriving predictions from them as logical consequences, and then (4) carrying out experiments based on those predictions to determine whether the original conjecture was correct. The association may be expressed in numerical and/or statistical terms and may vary (as examples) from an observed (or possibly anecdotal) relationship to a measured correlation, to a causal relationship. The information and data used to construct a Feature Graph may be obtained from one or more of a scientific paper, an experiment, a result of a machine learning experiment, human-made or machine-made observations, or anecdotal evidence of an association between two variables, as examples.

Because of the wide range of statistical association types represented in a Feature Graph and the wide variety of sources of information and/or data used to construct a Feature Graph, mathematical, language-based, and visual methods are employed by embodiments of the system and methods disclosed herein to express the quality, rigor, trustworthiness, reproducibility, reliability, and/or completeness of the information and/or data supporting a given statistical association.

In one embodiment, the disclosure is directed to a computer-executed method for identifying a relevant dataset for use in training a model related to a topic of interest. For example, the trained model may be used to classify or predict an aspect of a set of input data or features. The embodiment includes a set of instructions (e.g., computer-executable instructions contained in software modules or routines) to be executed by a programmed processing element. The method includes accessing a set of sources that include information regarding a statistical association between a topic of a study and one or more variables considered in the study. The information contained in the sources is used to construct a data structure or representation (the Feature Graph disclosed herein) that includes nodes and edges connecting nodes. Edges may be associated with information regarding a statistical relationship between two nodes. One or more nodes may have an associated dataset, with the dataset accessible using a link or other form of address or access element. Embodiments may include functionality that allows a user to describe and execute a search over the data structure to identify datasets that may be relevant to training a machine learning model, with the model being used in making a specific decision or classification.

Other embodiments may be represented by a data structure which includes nodes, edges, and links to datasets. The nodes and edges represent concepts, topics of interest, or a topic of a previous study. The edges represent information regarding a statistical relationship between nodes. Links (or another form of address or access element) provide access to datasets that establish (i.e., they support or demonstrate) a statistical relationship between one or more variables that were part of a study, or between a variable and a concept or topic of a study or investigation.

Other embodiments may include using one or more datasets that are identified using the methods and data structures disclosed herein to train a specific machine learning model. The trained model may then be used to make a decision, inference, or prediction, or to perform a classification of a set of input data. The trained model may be used in signal or image processing, adaptive control systems, sensor systems, as non-limiting examples.

Embodiments may also include techniques and tools to enable a user to display and investigate relationships between variables or parameters and a topic or goal of a study. This may enable the user to understand the relationships more fully and to assist in evaluating the relevance of a dataset and the inter-relationships between the variables or parameters in making a decision based on the outcome of the study.

Embodiments may also include techniques and tools to enable a user to specify a topic of interest, and in response be provided with a set of factors (such as variables) that have been shown to impact or be impacted by the topic based on statistically relevant data and information. Embodiments may also enable a user to identify sources of data used to determine the relevant factors impacting or impacted by a topic, establish a statistical relationship between topics or between a variable and a topic, generate an analysis of the relationship between a pair of topics, and provide tools to allow a user to visually navigate between statistically relevant data associated with multiple topics. These capabilities can assist the user to understand relationships between parameters or variables of a specific topic, between topics, and between parameters or variables of different topics.

In one embodiment, the disclosure is directed to a system for organizing, finding, and using data in one or more of the ways disclosed. The system may include a set of computer-executable instructions stored in (or on) a non-transitory memory or data storage element and an electronic processor or co-processors. When executed by the processor or co-processors, the instructions cause the processor or co-processors (or a device of which they are part) to perform a set of operations that implement an embodiment of the disclosed methods.

Other objects and advantages of the systems, apparatuses, and methods disclosed will be apparent to one of ordinary skill in the art upon review of the detailed description and the included figures. Throughout the drawings, identical reference characters and descriptions indicate similar, but not necessarily identical, elements. While the embodiments disclosed or described herein are susceptible to various modifications and alternative forms, specific embodiments are shown by way of example in the drawings and will be described in detail herein. However, the exemplary or specific embodiments are not intended to be limited to the particular forms disclosed. Rather, the present disclosure covers all modifications, equivalents, and alternatives falling within the scope of the appended claims.

BRIEF DESCRIPTION OF THE DRAWINGS

Embodiments of the disclosure are described with reference to the drawings, in which.

Note that the same numbers are used throughout the disclosure and figures to reference like components and features.

DETAILED DESCRIPTION

Figure 1A:
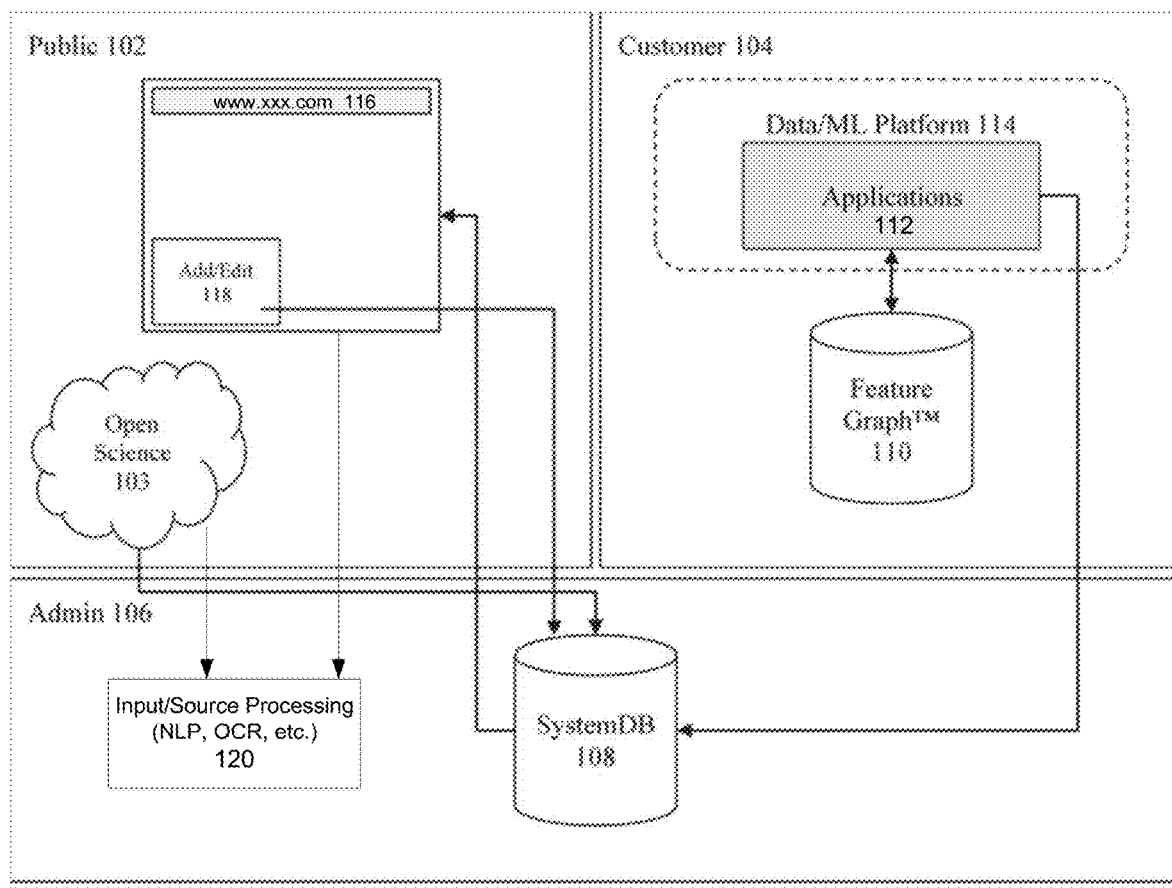
FIG. 1(A) is a block diagram illustrating an architecture that may be used to implement an embodiment of the system and methods disclosed herein.

One or more embodiments of the disclosed subject matter are described herein with specificity to meet statutory requirements, but this description does not limit the scope of the claims. The claimed subject matter may be embodied in other ways, may include different elements or steps, and may be used in conjunction with other existing or later developed technologies. This description should not be interpreted as implying any required order or arrangement among or between various steps or elements except when the order of individual steps or arrangement of elements is explicitly noted as being required.

Embodiments of the disclosure will be described more fully herein with reference to the accompanying drawings, which form a part hereof, and which show, by way of illustration, exemplary embodiments by which the disclosure may be practiced. The disclosure may, however, be embodied in different forms and should not be construed as limited to the embodiments set forth herein; rather, these embodiments are provided so that this disclosure will satisfy the statutory requirements and convey the scope of the disclosure to those skilled in the art.

Among others, the subject matter of the disclosure may be embodied in whole or in part as a system, as one or more methods, or as one or more devices. Embodiments may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, co-processor, microprocessor, CPU, GPU, TPU, QPU, or controller, as non-limiting examples) that is part of a client device, server, network element, remote platform (such as a SaaS platform), an "in the cloud" service, or other form of computing or data processing system, device, or platform.

The processing element or elements may be programmed with a set of executable instructions (e.g., software instructions), where the instructions may be stored on (or in) one or more suitable non-transitory data storage elements. In some embodiments, the set of instructions may be conveyed to a user through a transfer of instructions or an application that executes a set of instructions (such as over a network, e.g., the Internet). In some embodiments, a set of instructions or an application may be utilized by an end-user through access to a SaaS platform or a service provided through such a platform.

In some embodiments, the systems and methods disclosed herein may provide services through a SaaS or multi-tenant platform. The platform provides access to multiple entities, each with a separate account and associated data storage. Each account may correspond to a user, set of users, an entity, a set or category of entities, a set or category of users, a set or category of topics, an industry, or an organization, for example. Each account may access one or more services, a set of which are instantiated in their account, and which implement one or more of the methods or functions described herein.

In some embodiments, one or more of the operations, functions, processes, or methods described herein may be implemented by a specialized form of hardware, such as a programmable gate array, application specific integrated circuit (ASIC), or the like. Note that an embodiment of the inventive methods may be implemented in the form of an application, a sub-routine that is part of a larger application, a "plug-in", an extension to the functionality of a data processing system or platform, or other suitable form. The following detailed description is, therefore, not to be taken in a limiting sense.

As mentioned, the training of a machine learning model represents a general case which benefits from use of an embodiment of the disclosed systems and methods. A useful machine learning model is one that generates an output which a user can have enough confidence in to use as the basis for making a decision. To build a reliable model, it is necessary to identify and construct an appropriate dataset for training the learning process that produces the model. However, identifying and accessing training data (sometimes referred to as "sourcing features") is difficult at present in large part because of the conventional way in which information and data are organized.

Further, the most relevant, accurate, and effective training data would be data which an empirical (or otherwise reliable) study has shown to be relevant to the decision being made using the trained model. For example, if a dataset shows a demonstrable statistical association between one or more variables and an outcome, then presumably that dataset can be relied upon to properly train a model being used to determine if that outcome will occur. Similarly, if a dataset used in a study of a topic does not support a sufficient statistical association, shows none, or does not consider certain variables, then it likely would not be useful (or as reliable) for training the model.

Embodiments of the disclosed system and methods may include the construction or creation of a graph database. In the context of this description, a graph is a set of objects that are paired together if they have a close or relevant relationship. An example is two pieces of data that represent nodes and that are connected by a path. One node may be connected to many nodes, and many nodes may be connected to a specific node. The path or line connecting a first and a second node or nodes is termed an "edge". An edge may be associated with one or more values; such values may represent a characteristic of the connected nodes, or a metric or measure of the relationship between a node or nodes (such as a statistical parameter). A graph format may make it easier to identify certain types of relationships, such as those that are more central to a set of variables or relationships, or those that are less significant, as examples. Graphs typically occur in two primary types: "undirected", in which the relationship the graph represents is symmetric, and "directed", in which the relationship is not symmetric (in the case of directed graphs, an arrow instead of a line may be used to indicate an aspect of the relationship between the nodes).

In some embodiments, one or more of the operations, functions, processes, or methods disclosed or described herein may be implemented in whole or in part by a system that retrieves information about statistical associations of varying degree between variables or parameters in a study or that are associated with a topic. The retrieved data may be obtained from structured and/or unstructured sources and may be associated with data or a dataset that substantiates or supports the associations. The disclosed system and methods operate to store the retrieved information in a data structure that can be used to generate what is termed a "Feature Graph" herein. A Feature Graph represents the topic of a study (such as a goal or investigation), the variables (such as study parameters) examined in the study, the statistical association(s) between a variable and one or more variables and/or between a variable and the topic. A Feature Graph may include a link or other form of access to a set of data (referred to as a dataset) or measurable quantities that provide support for the statistical association(s) described in the study. The link may also or instead be to datasets that measure the variable in various populations (e.g., Females aged 18 and older or women in Japan, as examples).

In some embodiments, the statistical association(s) are expressed in numerical and/or statistical terms and may vary in significance from an observed association to a measured relationship, to a causal relationship. Mathematical, language-based, and visual methods are employed by some embodiments of the system to express the quality, rigor, trustworthiness, reproducibility, and/or completeness of the information and/or data supporting a given statistical or observed association.

For example, a given statistical association might be associated with specific score(s), label(s), and/or icon(s) in a user interface based on its scientific "quality" or reliability (overall and on specific parameters such as "has been peer reviewed") to indicate to the user whether to investigate the association further. In other embodiments, statistical associations retrieved by searching the Feature Graph may be filtered based on their scientific quality scores. In some embodiments, the computation of a quality score may combine data stored within the Feature Graph (for example, the statistical significance of a given association or the degree to which the association is documented) with data stored outside the Feature Graph (for example, the number of citations received by a journal article from which the association was retrieved, or the h-index of the author of that article). Note that the Feature Graph is used to represent and access statistically relevant data or information, and therefore such quality measures are more relevant for the use cases described herein than such measures would be if used in conventional knowledge graphs or semantic search results.

As noted, using conventional approaches data is organized to be searchable primarily based on language-based or semantic matching. For example, this form of organization might be based on metadata about a dataset (e.g., author name), a label of a column, row, or field in a dataset, or a semantic relationship between a user's search input and those data labels (such as equivalence, sufficient similarity, or being common synonyms, as examples). This latter approach is the core premise of "knowledge graphs", which represent facts related to topics and the semantic relationships between them. For example, an apple "is a type of" fruit that "is produced in" New York. Employing a knowledge graph, a search for datasets on "apple" could then, in theory, retrieve datasets about other fruit (for example, oranges) or other fruit produced in New York (for example, pumpkins). Data in the public domain and in companies is largely organized based on language and semantic relationships between labels or terms.

However, as mentioned, this is inherently limited in its utility for cases where the relationships between variables and topics and between topics are of greater interest when those relationships can be shown to be statistically significant. Embodiments address this need by providing several techniques for displaying, investigating, and quantifying the relationships between factors that have been shown to be statistically relevant to a topic, to each other, or between topics. This provides a user with an efficient and reliable way to investigate data sets, topics, and variables in studies that would otherwise be unavailable, and hence might not be discoverable in the absence of the disclosed embodiments.

Using conventional approaches, it is possible to find datasets based on language in or about a dataset (i.e., search terms that "match" a label or metadata), and to find datasets based on semantic relationships among words in (and about) datasets and search terms (such as by reference to a general category or label to which others are semantically associated or linked). As a result, if a data scientist knows what topic (or variable(s)) to search for, she can, at least in theory, find potentially relevant data (although this is subject to the assumed completeness of the semantic associations in the knowledge graph).

However, the knowledge graph structure or method of organizing and finding data is inappropriate for some applications, such as predictive modeling and machine learning. This is because in a typical predictive analytics or machine learning task, a data scientist or researcher knows her topic or target (i.e., the end goal, result, or object of a study), but not what data (such as features, factors, variables, or characteristics) will be most useful to predict it or its value (e.g., the presence or absence of some situation). Therefore, a data scientist does not know what topic or contributing factor(s) to search for (i.e., those that may be relevant to, or most likely predictive of, the object of the study). This situation makes using a conventional data management platform or knowledge graph approach to identify and access relevant data both inefficient and potentially unreliable. It is widely recognized that one of the most challenging parts of implementing machine learning at present is sourcing appropriate training datasets for a machine learning model.

Conventional approaches to organizing data, and some of their disadvantages are shown in the Table below:

| Solution | Disadvantages |
| --- | --- |
| Master Data Management (MDM) Platform/Machine Learning Data Catalog/Feature Store | Datasets/features are retrieved based on language (dataset name, keywords, row or column labels, author name, model ID) or usage metadata, and not the statistical associations between topics measured by the data. This does not help in identifying and accessing data for variables predictive of a given target (i.e., a topic or goal of a study). |
| Knowledge Graph | Information is organized based on semantic (rather than statistical) relationships. |
| Dataset Search Engine | Datasets are retrieved based on language (dataset name, keywords, row or column labels, author name, semantic relationships) not the statistical (or other types of) associations between topics measured by the data. This does not help access data for variables mathematically associated with a given target or topic of interest. |

FIG. 1(A) is a block diagram illustrating an architecture 100 that may be used to implement an embodiment of the system and methods described herein, and specifically to access and process sources of data for use in generating a Feature Graph. A description of the example architecture is provided below:

Architecture

In some embodiments, the architecture elements or components illustrated in FIG. 1 may be distinguished based on their function and/or based on how access is provided to the elements or components. Functionally, the system's architecture 100 distinguishes between:
- information/data access and retrieval (illustrated as Applications 112 Add/Edit 118, and Open Science 103)—these are the sources of information and may include descriptions of experiments, studies, investigations, or machine learning models (as non-limiting examples), that provide the data, variables, topics, concepts, and statistical information that serve as a basis for generating a Feature Graph or similar data structure);
- a database (illustrated as SystemDB 108)—an electronic data storage medium, component, or element, and utilizing a suitable data structure or data schema and data retrieval protocol/methodology; and
- applications (illustrated as Applications 112 and website 116)—these are executed in response to instructions or commands received from a public user (Public 102), Customer 104, and/or an Administrator 106. The applications may perform one or more useful operations or functions, such as:
  - searching SystemDB 108 or a Feature Graph 110 and retrieving variables, datasets, and other information of relevance to a user query;
  - identifying specific nodes or relationships of a Feature Graph;
  - writing data to SystemDB 108 so that the data may be accessed by the Public 102 or others outside of the Customer or business 104 that owns or controls access to the data (note that in this sense, the Customer 104 is serving as an element of the information/data retrieval architecture/sources);
  - generating a Feature Graph from one or more specified datasets;
  - characterizing a specific Feature Graph according to one or more metrics or measures of complexity or relative degree of statistical significance, as examples; and/or
  - getting recommendations for datasets to use in training a machine learning model or for another identified purpose;

From the perspective of access to the system and its capabilities, the system's architecture distinguishes between elements or components accessible to the public 102, elements or components accessible to a defined customer, business, organization or set of businesses or organizations (such as an industry consortium or "data collaborative" in the social sector) 104, and elements or components accessible to an administrator of the system and platform 106;

Information/data about or demonstrating statistical associations between topics, factors, or variables may be retrieved (i.e., accessed and obtained) from a number of sources. These may include (but are not limited to) journal articles, technical and scientific publications and databases, digital "notebooks" for research and data science, experimentation platforms (for example for A/B testing), data science and machine learning platforms, and/or a public website (element/website 116) where users can input observed statistical (or anecdotal) relationships between observed variables and topics, concepts, or goals of a study or investigation;
- For example, using natural language processing (NLP), natural language understanding (NLU), and/or computer vision for processing images (as illustrated by Input/Source Processing element 120), components of the information/data retrieval architecture may scan (such as by using optical character recognition, OCR) or "read" published or otherwise accessible scientific journal articles and identify words and/or images that indicate a statistical association has been measured (for example, by recognizing the term "increases" or another suggestive or relevant term or description), and in response, retrieve information/data about the association and about datasets that measure (e.g., provide support for) the association (as suggested by the element labeled "Open Science" 103 in the figure and by step or stage 202 of FIG. 2);
- Other components of the information/data retrieval architecture (not shown) may provide users with a way to input code into their digital "notebook" (e.g., Jupyter Notebook) to retrieve the metadata output of a machine learning experiment (e.g., the "feature importance" measurements of the features used in a given model) and information about datasets used in an experiment;
- Note that in some embodiments, information/data retrieval is typically happening on a regular or continuing basis, providing the system and platform with new information to store and structure, and thereby make available to users;
- In some embodiments, algorithms/model types (e.g., Logistic Regression), model parameters, numerical values (e.g., 0.725), units (e.g., log loss), statistical properties (e.g., p-value=0.03), feature importance, feature rank, model performance (e.g., AUC score), and other statistical values regarding an association are identified and stored as retrieved or extracted from a source;
- Given that researchers and data scientists may employ different words to describe the same or a similar concept, variable names (e.g., "aerobic exercise") are stored as retrieved and may then be semantically grounded to (i.e., linked or associated with) public domain ontologies (e.g., Wikidata) to facilitate clustering of variables (and the associated statistical association(s)) based on common, typically synonymous, or closely related terms and concepts;
  - For example, a variable labeled as "log_househd_sale_price" by a given user might be semantically associated by the system (and further affirmed by the user) with "Real Estate Price," a topic in Wikidata with the unique ID, Q58081362;
- A central database ("SystemDB" 108) stores the information/data that has been retrieved and its associated data structures (i.e., nodes, edges, values), as described herein. An instance or projection of the central database containing all or a subset of the information/data stored in SystemDB is made available to a defined customer, business, or organization 104 (or group thereof) for their own use (e.g., in the form of a "Feature Graph" 110);

Because access to a particular Feature Graph may be restricted to certain individuals associated with a given business or organization, it may be used to represent information/data about variables and statistical associations that may be considered private or proprietary to the given business or organization 104 (such as employment data, financial data, product development data, or R&D data, as non-limiting examples);

Each customer/user has their own instance of SystemDB in the form of a Feature Graph. All Feature Graphs read data from SystemDB concurrently and in most cases regularly, thereby ensuring that users of a Feature Graph have the most up to date knowledge stored in SystemDB;

Applications 112 may be developed (built to be executed) on top of the Feature Graph 110; as examples, applications may read data from it, may write to it, and some may both read and write data to a Feature Graph. An example of an application is a recommender system for datasets for use in a model training task (referred to as a "Data Recommender" herein). A customer 104 using the Feature Graph 110 may use a suitable application 112 to "write" information/data to SystemDB 108 should they wish to share certain information/data with a broader group of users outside their organization or with the public;

An Application 112 may be integrated with a Customer's 104 data platform and/or machine learning (ML) platform 114. An example of a data platform is Google Cloud Storage. An ML (or data science) platform could include software such as Jupyter Notebook;

Such a data platform integration would, for example, allow a user to access a feature recommended by a Data Recommender application in the customer's data storage or other data repository. As another example, a data science/ML platform integration would, for example, allow a user to query the Feature Graph from within a notebook;

Note that in addition to, or instead of such integration with a Customer's data platform and/or machine learning (ML) platform, access to an application may be provided by the Administrator to a Customer using a suitable service platform architecture, such as Software-as-a-Service (SaaS) or similar multi-tenant architecture. A further description of the primary elements or features of such an architecture is described herein with reference to FIGS. 5-7;

In some embodiments, a web-based application may be made accessible to the Public 102. On a website (such as www.xxx.com, or "System.com" 116), a user could be enabled to read from and write to SystemDB 108 (as suggested by the Add/Edit functionality 118 in the figure) in a manner similar to that experienced with a website such as Wikipedia; and In some embodiments, data stored in SystemDB 108 and exposed to the public on System.com 116 may be made freely available to the public in a manner similar to that experienced with a website such as Wikipedia.

Figure 1B:
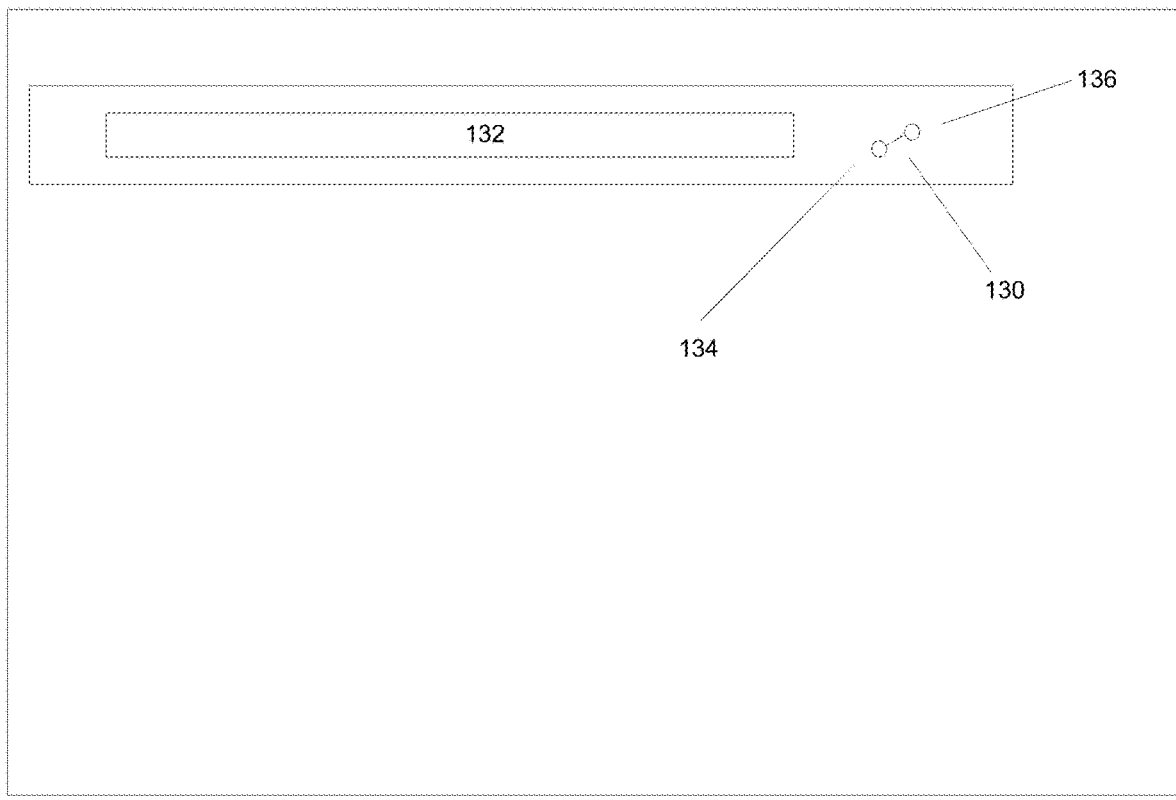
FIG. 1(B) is a diagram illustrating a user interface icon that may be used in an implementation of an embodiment of the disclosed system and methods to enable a user to initiate a statistical search based on an entered topic or query.

FIG. 1(B) is a diagram illustrating a user interface icon 130 that may be used in an implementation of an embodiment of the system and methods disclosed herein to enable a user to initiate a Statistical Search, in contrast to a semantic or conventional search, and to identify a location (the outlined query input "box" 132) into which to insert a Statistical Search query.

Note that in contrast to a search bar and associated magnifying glass icon that conventional search engines use to visually indicate a semantic search and in some cases the depth of the search they provide, an embodiment may instead display a "micro-graph" icon 130 comprising two nodes (134 and 136) and one edge connecting the nodes, indicating to a user that a Statistical Search can be initiated and that such a search is implemented in a broader sense (i.e., looking for statistical associations) than a standard semantic search. In some embodiments, the distinct icon representing a Statistical Search may provide a user with a tool to control aspects of the search. For example, in one embodiment, by selecting the source node 134, the target node 136, or both nodes, a user may specify her intent with respect to traversal of a Feature Graph. By selecting the lower of the nodes 134, a user may specify her interest in knowing what the search input is related to, what it predicts, and what is caused by it, and by selecting the higher of the two nodes 136 a user may specify her interest in knowing what predicts or causes the search input. Further, by selecting both nodes 134 and 136, a user may specify her interest in knowing how more than 1 search inputs are related. In operation, a user's selection of one or both nodes in the user interface icon or element filters the Statistical Search results for associations upstream from the search input (input as target), downstream from the search input (input as source), or for paths (and the related variables) that link two inputs.

As indicated by the disclosed system and methods and accompanying descriptions, there is a fundamental difference between a standard semantic search and a "statistical search" as described herein. The ability to perform and present results of a statistical search is one of the benefits and advantages of the disclosed system and methods, as it enables users to retrieve one or more variables, parameters, or features that are statistically associated with their input of a topic or goal. Such a search process is only possible with a Feature Graph data structure that is constructed and utilized as disclosed.

As a further example, a conventional search employing semantic relations would have the following characteristics:
Input: Variable or Concept
Output: All nodes that match or are semantically related to the Input, filterable by user-specified type (e.g., Datasets).

Example

Input=Smoker
Output=Smoking, Smokers, Cigarettes, as examples.

In contrast, a statistical search as implemented by an embodiment of the system and methods disclosed herein has the following characteristics:
Input: Variable or Concept
Output: Variables and/or concepts statistically associated to the Input, filterable by user-specified type (e.g., Datasets).

Example

Input=Smoker
Output=High Blood Pressure, Weekly Earnings, Gender is Male, as examples.

Furthermore, in some embodiments, the ranking of the output results may consider the value and quality of the identified statistical association.

Figure 2:
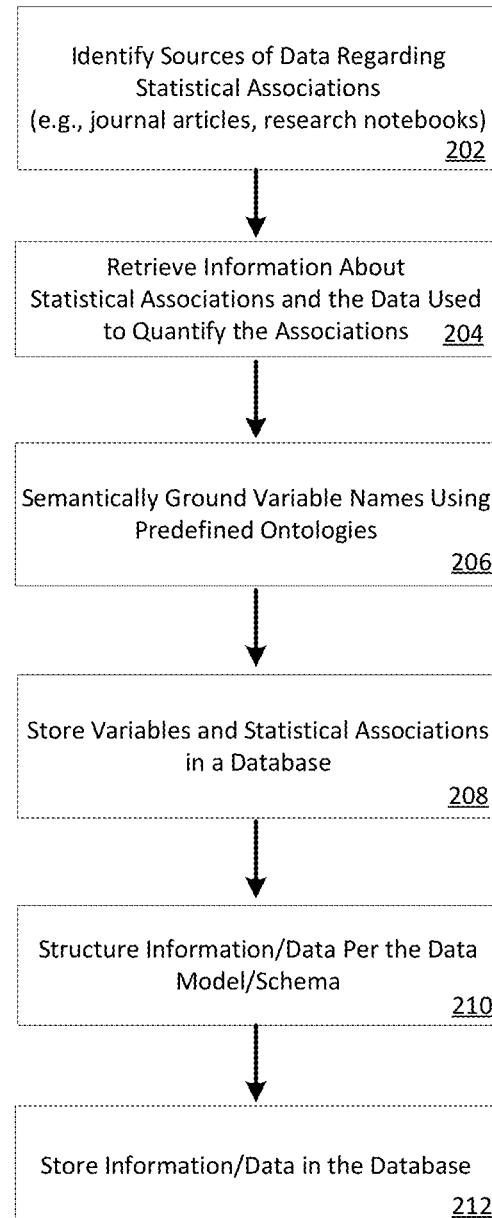
FIG. 2 is a flow chart or flow diagram illustrating a process, method, function or operation for constructing a Feature Graph from data and information extracted from sources and contained in a database, using an implementation of an embodiment of the disclosed systems and methods.

FIG. 2 is a flow chart or flow diagram illustrating a process, method, function, or operation for constructing a Feature Graph 200 using an implementation of an embodiment of the systems and methods disclosed herein. A constructed Feature Graph may be traversed as part of performing a task (e.g., to identify potentially relevant datasets or identify variables and/or topics of statistical relevance to an entered topic or subject, as examples), and examples of tasks and the traversal process are described further herein.

As shown in FIG. 2, in some embodiments, a Feature Graph is constructed or created by identifying and accessing a set of sources that contain information and data regarding statistical associations between variables or factors used in a study (as suggested by step or stage 202). As non-limiting examples, such sources may be in the form of published articles, technical reports, or research notebooks. This type of information may be retrieved on a regular or continuing basis to provide information regarding variables, statistical associations, and the data used to support those associations (as suggested by 204). As noted, this information and data is processed to identify variables used or described in those sources, and to identify and capture the statistical associations between one or more of those variables and one or more other of the variables, and between one or more of those variables and a topic or subject of an investigation or study.

The regular and/or continuous access and processing of data and information contained in the sources enables the construction of a database containing data and information regarding multiple subjects or topics and may be used to investigate relationships between variables and between variables and a topic. Such a database may also be used to identify and evaluate relationships between topics or between variables in one study and the variables or topic of another study. The statistical information that is associated with the variables and topics in multiple studies may be evaluated across multiple variables and/or topics to provide insights into trends, previously unrecognized relationships, and suggest further areas of investigation.

Continuing with a description of FIG. 2, at 202 one or more sources of data/information are accessed. The accessed data/information is processed to identify variables (such as parameters, variables, or features of a study) and statistical associations described in the source or sources 204. Such processing may include image processing (such as OCR), natural language processing (NLP), natural language understanding (NLU), trained models, or other forms of analysis that assist in understanding and extracting the contents of a journal paper, research notebook, experiment log, or other record of a study or investigation.

Further processing may include accessing an ontology (e.g., an International Classification of Diseases) or other set of data (e.g., a technical dictionary) that provides semantic equivalents or semantically similar terms to those used for the variables (as suggested by step or stage 206). This can assist in expanding the variable names used in a specific study to a larger set of substantially equivalent or similar entities or concepts that may have been used in other studies and assist in identifying and processing information and data that may be of interest across different studies. Once identified, the variables (which, as noted may be known by different names or labels) and statistical associations are stored in a database (208), for example SystemDB 108 of FIG. 1.

The results of processing the accessed information and data from the sources are then structured or represented in accordance with a specific data model or schema (as suggested by step or stage 210). This model may include fields or labels for the elements used to construct a Feature Graph (i.e., nodes representing a topic or variable, edges representing a statistical association, and measures including a metric, quantification, or evaluation of a statistical association described in a study).

The populated data model for each source is then stored in the database (212), and may be accessed to construct or create a Feature Graph for a specific user or set of users. In some embodiments, the data and information used to construct a Feature Graph for a specific user may be limited to a subset of that stored in the database and be determined by a filtering process or rule-set that identifies specific sources, proprietary data, or be based on user identification or other factor in a task. This allows a user to construct a Feature Graph from a specific set of source data which may be stored locally or remotely in a larger database.

Figure 3A:
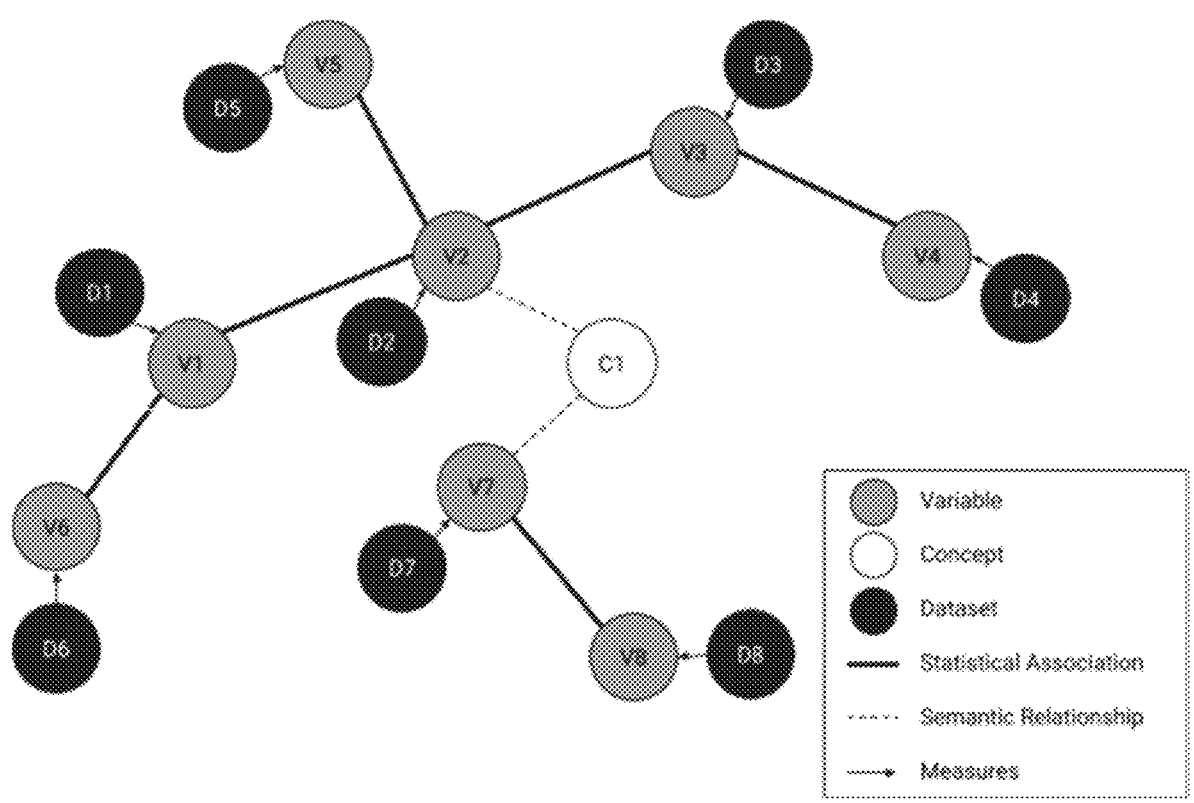
FIG. 3(A) is a diagram illustrating an example of part of a Feature Graph data structure that may be used to organize and access data and information, and which may be created using an implementation of an embodiment of the disclosed system and methods.

As noted, the process or operations described with reference to FIG. 2 enable the construction of a graph containing nodes and edges linking certain of the nodes (an example of which is illustrated in FIG. 3(A)). The nodes represent topics, goals, targets, or variables of a study (such as a scientific investigation) or observation, and the edges represent a statistical association between a node and one or more other nodes of the Feature Graph. Each statistical association may be associated with one or more of a numerical value, model type, or algorithm, and with statistical properties that describe the strength, confidence, or reliability of a statistical association between two nodes (variables, factors, or topics) connected by an edge. The numerical value, model type, or algorithm, and the statistical properties associated with the edge may be indicative of a correlation, a predictive relationship, a cause-and-effect relationship, or an anecdotal observation, as non-limiting examples.

Once information and data are accessed and processed for storage in a database (such as SystemDB, which may contain one or more of unprocessed data and information, processed data and information, and data and information stored in the form of a data model), a Feature Graph that contains a specified set of variables, topics, targets, or factors may be constructed. The Feature Graph for a particular user may include all the data and information in SystemDB or a subset thereof. For example, the Feature Graph (110 in FIG. 1) for a specific Customer 104 may be constructed based on selecting data and information from SystemDB 110 that satisfy conditions such as the applicability of a given domain (e.g., public health) in SystemDB to the domain of concern of a customer (e.g., media). As mentioned, in deploying, generating, or constructing a Feature Graph for a specific customer or user, data in SystemDB may be filtered by removing data that would not be relevant to the problem or concept/topic being investigated by the user.

The Table below provides a summary of certain differences between a Feature Graph and a Knowledge Graph, as those terms are used herein. As indicated, the primary nodes and edges differ in meaning and significance between a conventional Knowledge Graph and the disclosed Feature Graph.

|  | Knowledge Graph | Feature Graph |
| --- | --- | --- |
| Primary Node | Topics (people, places, things, etc.) | Variables (measurable empirical objects) |
| Primary Edge | Semantic Relationship (retrieved from facts and taxonomies) | Statistical Relationship (retrieved from experiments, measurements, observations) |

After constructing a Feature Graph for a specific user or set of users, the graph may be traversed to identify variables of interest to a topic or goal of a study, model, or investigation, and if desired, to retrieve the datasets that support or confirm the statistical significance of those variables or that measure variables of interest. In one embodiment, the process by which a Feature Graph is traversed may be controlled by one of two methods: (a) explicit user tuning of the search parameters or (b) algorithmic based tuning of the parameters for variable/data retrieval. For example, in some use cases described herein, user tuning would typically be utilized, while in use cases in which a Data Recommender application was used to identify model training data, algorithmic tuning would typically be utilized.

For example, a constructed or created Feature Graph may be traversed to identify datasets of potential value to a specific investigation, topic, study, or analysis. In this example, a user may input factors to be used as part of defining a search query. These factors may include a Target/Topic, Variable, or Factor of interest (for example, "housing prices") and a parameter of the model being constructed (for example, joinable to the key "census tract" and measured in population "Chicago, 2017"). A Data Recommender application (such as 112 in FIG. 1) then operates or functions to traverse the Feature Graph to identify datasets that are expected to be of relevance and useful to training a specific model. The identified datasets may then be ranked, filtered, or otherwise ordered prior to presentation to a user. Other examples of an application, task, goal, or objective of using data and information represented by a Feature Graph are disclosed and will be described herein.

FIG. 3(A) is a diagram illustrating an example of part of a Feature Graph data structure 300 that may be used to organize and access data and information, and which may be created using an implementation of an embodiment of the disclosed system and methods. A description of the elements or components of Feature Graph 300 and the associated Data Model implemented is provided below.

Feature Graph

As disclosed, a Feature Graph is a way to structure, represent, and store statistical relationships between topics and their associated variables, factors, categories, parameters, or features. The core elements or components of a Feature Graph are variables (identified as V1, V2, etc. in FIG. 3(A)) and statistical associations (identified as connecting lines or edges between nodes representing variables). Variables may be linked to or associated with a "concept" (identified as C1 in the figure), which is a sematic concept, goal, or topic that is not, in and of itself, necessarily measurable (for example, the variable "number of robberies" may be linked to the concept "crime"). Variables are measurable empirical objects, parameters, or factors. In statistics, an association between two or more variables or concepts is typically defined as a statistical relationship, whether causal or not, between two random variables. Statistical associations typically result from one or more steps or stages of what is termed the Scientific Method and may be characterized as weak, strong, observed, measured, correlative, causal, or predictive, as examples.

As an example and with reference to FIG. 3(A), a statistical search for input variable V1 may retrieve one or more of the following: (i) variables statistically associated with V1 (e.g., V6, V2) (where in some embodiments, a variable may only be retrieved if a statistical association value is above a defined threshold), (ii) variables statistically associated (directly or indirectly) with those variables (e.g., V5, V3, V4) (in some embodiments, a variable may only be retrieved if a statistical association value is above a defined threshold), (iii) variables semantically related by a common concept (e.g., C1) to a variable or variables (e.g., V2) that are statistically associated to the input variable V1 (e.g., V7, as it is semantically related to C1, which is semantically related to V2, which is statistically associated with to V1), (iv) variables statistically associated to those variables identified (e.g., V8, which is statistically associated with V7); and the dataset or datasets that provide support for measuring the associated variables or demonstrating the statistical association of the retrieved variables (e.g., D6, D2, D5, D3, D4, D7, D8). In contrast, a semantic search for input variable V1 retrieves only: (1) the variable V1, and (2) the dataset(s) measuring that variable (e.g., D1).

A Feature Graph is populated with information/data about statistical associations retrieved from (for example) journal articles, scientific and technical databases, digital "notebooks" for research and data science, experiment logs, data science and machine learning platforms, a public website where users can input observed or perceived statistical relationships, and in some cases, other sources;

- Using natural language processing (NLP), natural language understanding (NLU), and/or image processing (OCR, visual recognition) techniques, components (e.g., processes or elements) of the information/data retrieval architecture can scan or "read" published scientific journal articles, identify words or images that indicate that a statistical association has been measured (for example, "increases"), and retrieve information/data about the association and about datasets that measure/confirm the association;
- Other components of the information/data retrieval architecture provide data scientists and researchers with a way to input code into their digital "notebook" (e.g., Jupyter Notebook) to retrieve the metadata output of a machine learning experiment (e.g., the "feature importance" measurements of features used in a model) and information about datasets used in a study, experiment, or investigation. Note that information/data retrieval may be occurring regularly and, in some cases, continuously, providing the system and platform with new information to store, structure, and expose to users;
- In one embodiment, datasets are associated to variables in a Feature Graph with links to the URI of the relevant dataset/bucket/pipeline, or another form of access or address;
    - This allows a user of the Feature Graph to retrieve datasets based on the demonstrated or determined predictive power of that data with regards to a specified target/topic (rather than the potentially less relevant or irrelevant datasets about topics only semantically related to a specified target/topic, as in a conventional knowledge graph);
    - For example, using an embodiment of the system and methods described herein, if a data scientist searches for "vandalism" as a topic or goal of a study, they will retrieve datasets for topics that have been shown to predict or be relevant in a statistical sense to that target/topic—for example, "household income," "luminosity," and "traffic density" (and the evidence of those statistical associations to the target)—rather than datasets measuring instances of vandalism;
- Numerical values (e.g., 0.725) and statistical properties (e.g., p-value=0.03) of an association are stored in SystemDB (and hence may be part of a generated or constructed Feature Graph) as obtained from sources. As mentioned, given that researchers and data scientists may employ different words to describe the same concept, variables names (e.g., "aerobic exercise") are stored as retrieved from sources and are semantically grounded to (i.e., associated with and in some cases considered equivalent to an entry in one or more) public domain ontologies (e.g., Wikidata). This facilitates clustering of variables (and the related statistical associations) based on common or similar concepts, such as synonymous or terms otherwise considered equivalent;

The disclosed system or platform employs mathematical, language-based, and visual processing techniques to express properties of the statistically relevant data obtained from the sources, for example the quality, rigor, trustworthiness, reproducibility, and completeness of the information and/or data supporting a given statistical association;

- For example, a given statistical association might carry specific score(s), label(s), and/or icon(s) in a user interface based on its scientific quality (overall and with regards to specific parameters such as "has been peer reviewed") to indicate to a user whether to investigate the association further. In some embodiments, statistical associations retrieved by searching the Feature Graph are filtered based on their scientific quality scores or a similar metric;
    - In certain embodiments, the computation of quality scores may combine data stored within the Feature Graph (for example, the statistical significance of a given association or the degree to which the association is documented) with data stored external to the Feature Graph (for example, the number of citations received by the journal article from which the association was retrieved, or the h-index of the author of that article);
- For example, a statistical association with a high and significant "feature importance" score measured in a model with a high area under the curve (AUC) score, with a partial dependence plot (PDP), and that is documented for reproducibility might be considered a "strong" statistical association in the Feature Graph and given an identifying color or icon in a graphical user interface;
- Note that in addition to retrieving variables and statistical associations, an embodiment may also retrieve other variables used in an experiment to contextualize a statistical association for a user. This may be helpful if, for example, a user wants to know if certain variables were controlled for in an experiment or what other variables (or features) are included in a model.

Data Model

The primary (data) objects in a Feature Graph (or SystemDB) will typically include one or more of the following:
Variable (or Feature)—What is being measured and in what population?
Concept—What is the topic or concept being studied?
Neighborhood—What is the subject being measured?
Statistical Association—What is the mathematical basis for and value of the relationship?
Model (or Experiment)—What is the source of the measurement?
Dataset—What is the dataset that was used to measure a relationship (e.g., a training set) or that measures a variable?

These objects are related in a Feature Graph as follows (and as illustrated in FIG. 3(A)):
Variables are linked to other Variables via Statistical Associations;
Statistical Associations result from Models and are supported by Datasets; and
Variables are linked to Concepts and Concepts are linked to Neighborhoods.

Referring to FIGS. 2 and 3(A), as noted, one use of a Feature Graph is to enable a user to search a Feature Graph for one or more datasets that contain variables that have been shown to be statistically associated with a target topic, variable, or concept of a study. As an example of a representative use case:
A user inputs a topic, study, or variable and wants to retrieve datasets that could be used to train a model to predict that topic, study, or variable, i.e., those that are linked to variables statistically associated with the input topic, study, or variable;
   For example, and with reference to FIG. 3(A), a statistical search input of V1 causes an algorithm (for example, breadth-first search (BFS)) to traverse the Feature Graph 300 and return one or more of:
      variables statistically associated with V1 (e.g., V6, V2, where in some embodiments, a variable may only be retrieved if a statistical association value is above a defined threshold);
      variables statistically associated (directly or indirectly) with those variables (e.g., V5, V3, V4, where in some embodiments, a variable may only be retrieved if a statistical association value is above a defined threshold);
      variables semantically related by a common concept (e.g., C1) to a variable or variables (e.g., V2) that are statistically associated to the input variable V1 (e.g., V7, as it is semantically related to C1, which is semantically related to V2, which is statistically associated with to V1);
      variables statistically associated to those variables identified (e.g., V8, which is statistically associated with V7); and
      the dataset or datasets that provide support for measuring the associated variables or demonstrating the statistical association of the retrieved variables (e.g., D6, D2, D5, D3, D4, D7, D8);
For the example use case of identifying data sets that may be used for training a machine learning model, after traversing the Feature Graph and retrieving potentially relevant datasets, those datasets may be filtered, ranked, or otherwise ordered based on the application or use case:
   Datasets retrieved through the traversal process described may be subsequently filtered based on criteria input by the user with their search and/or by an administrator of an instance of the software. Example search dataset filters may include one or more of:
      Population and Key: Is the variable of concern measured in the population and key of interest to the user (e.g., a unique identifier of a user, species, city, or company, as examples)? This impacts the user's ability to join the data to a training set for machine learning;

Compliance: Does the dataset meet applicable regulatory considerations (e.g., GDPR compliance)?

Interpretability/Explainability: Is the variable interpretable by a human?

Actionable: Is the variable actionable by the user of the model?

In one embodiment, a user may input a concept (represented by C1 in FIG. 3(A)) such as "crime", "wealth", or "hypertension", as non-limiting examples. In response, the disclosed system and methods may identify the following by using a combination of semantic and/or statistical search techniques:

A concept (C2) that is semantically associated with C1 (note that this step may be optional);

Variables ($V_X$) that are semantically associated with C1 and/or C2;

Variables that are statistically associated with each of the variables $V_X$;

A measure or measure of the identified statistical association; and

Datasets that measure each of the variables $V_X$ and/or that demonstrate or support the statistical association of the variables that are statistically associated with each of the variables $V_X$.

In some embodiments of the disclosed system and methods, multiple edges (statistical associations) will link a given pair of nodes (where the nodes represent variables, factors, or concepts), indicating multiple pieces of support for evidence regarding a statistical association between the given node pair. Given the breadth of sources the system may retrieve information from and the evolving nature of science and technology, it is also conceivable that this group of edges will contain or represent multiple or a range of association values (and/or relationships).

In such cases, the system will access the relevant information in the database and generate additional edges (termed "Summary Associations") representing statistical summaries of the information (for example, the distribution of values, the degree of consensus about the nature and strength of the association, or the populations where an association has been measured). Note that Summary Association edges can be retrieved by applications, for example to provide a user with a concise view of a given domain of interest and assist in answering questions about the consensus around a particular set of statistical associations, how a particular set of statistical associations has changed over time, and what has or has not been studied and in what populations.

In addition to the identification of one or more data sets that may be used for training a machine learning model, embodiments are directed to construction and use of a Feature Graph for goals or tasks that may include one or more of the following:

Searching for a topic to discover/identify the factors (variables or parameters) that have been shown to impact the topic or be impacted by it based on data and information indicating a statistical significance;

This may include identifying the corresponding data sources and data points for associated nodes at varying resolutions or groupings of source data (e.g., based on a specified population when investigating a country's health data or a patient's health data);

For example, in some embodiments, once a set of data sources have been identified that support a statistical relationship of sufficient strength or reliability, a user may select those data sets of interest and view a reconstructed Feature Graph based on those data sets;

The data sources or data sets may be used to train a machine learning model and/or to evaluate the strength or significance of a statistically relevant relationship between two variables, between two topics, or between a topic and a variable;

Improving search capabilities and completeness through the extraction of statistical information and associated metadata from documents, and establishing statistical relationships between topics using Large Language Models;

As a non-limiting example, GPT-3 may be used as a basis for training one or more models to identify and extract specific information from sources that can be stored in a database and used by the system or platform to generate a Feature Graph in response to a user input;

Auto-generating a meta-analysis of the relationship between a pair of topics based on statistical evidence gathered from literature, datasets, and machine learning models;

This may be used as part of answering questions for professionals that are not feasible to answer today in a systematic or continuous way (to account for new information or evidence), or which require significant investments of time and resources to produce. This type of analysis may be used to identify approaches for future research and funding, as an example;

As non-limiting examples, this may include using a combination of statistically related and semantically matching information extracted from sources related to the strength, directionality, sign, or metric used as part of a study regarding a topic; and Enabling a user to visually navigate a large knowledge base of statistically-related information across multiple resolutions of information (e.g., from topics to metrics to features);

This may assist a user to understand and investigate different levels of abstraction of the underlying data and relationships—this also assists in better understanding the connections between the different levels, which may help in identifying the most relevant data sets or relationships for the user.

As one example of how to present data and information stored in a database to a user, the SystemDB may be leveraged to provide context to readers and viewers of content on the Internet. For example, a news website could link a concept or variable referenced in an article to the associated object in the SystemDB and retrieve (via an API) a graph that could be embedded in the news article, thereby providing readers with context about the known statistical associations to the concept or variable referenced in the article. This is an example of a value-add that the disclosed system and platform can provide to users by providing additional information based on the context of a user experience.

The following provides an additional description of the implementation of an embodiment of each of the goals or tasks mentioned.

Figure 3B:
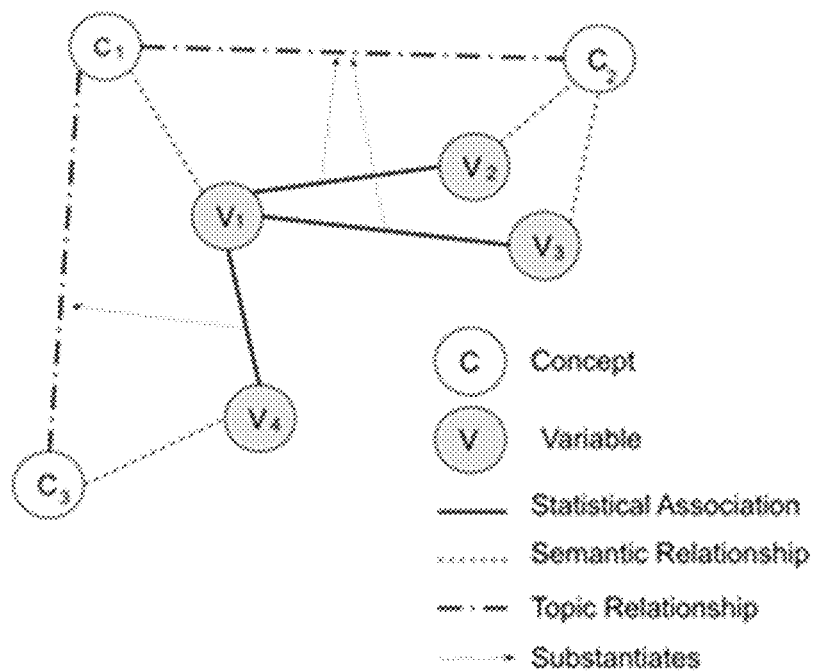
FIG. 3(B) is a diagram illustrating a portion of a feature Graph and the statistical and semantic relationships between concepts/topics and variables.

Searching for a topic to discover/identify the factors (variables or parameters) that have been shown to impact the topic or be impacted by it based on statistical evidence may include the following stages:

Construct a relevant Feature Graph;
  The constructed Feature Graph may be based on proprietary data and/or data collected by the system or platform from publicly available sources;
    In some embodiments, a user may provide one or more the search terms in the form of a query, and the platform and associated processes operate to identify the resources that "match" the query. The resources may include public datasets, private datasets that the user has specified in onboarding, journal papers and trained models, as examples;
      Subsequently, the user can filter or sort the results to further narrow the search to specific resources (as an example);
    In some embodiments, a user may specify one or more filters to use to select the data of interest, such as specific sources, populations, or other factors that may be indicated by metadata associated with a source;
User inputs a concept/topic of interest (C1);
A graph traversal algorithm travels through variables ($V_i$) connected to the concept and retrieves statistically associated variables and their connected concepts/topics (as suggested by FIG. 3(B), which is a diagram illustrating a portion of a feature Graph and the statistical and semantic relationships between concepts/topics and variables;
Aggregation algorithms or techniques may then be used to analyze the statistical associations underlying the identified connections, substantiate a connection between topics and variables, and generate measures of the impact and quality of the relationship (e.g., strength, direction, or quality);
  The system or platform may operate to categorize statistical types and values into known scales of strength (given common scientific understanding of the statistic type) and/or by using the relative coverage of that statistic type to generate a standardized measure of the strength of the relationship(s) based on the underlying data. These standardized strengths allow for a consistent and understood measure which is comparable across topics and variables;
  The system or platform may use association type or statistic type to infer an aggregate/distribution of a direction of a topic relationship—this assists a user to understand what impacts the query topic and what topics are impacted by the query topic;
  The system or platform may aggregate the underlying associations and their source metadata to derive an estimate of how complete or reliable the information underlying the substantiated relationship is (e.g., by considering metadata on a study such as the publisher, how reliable that publisher is, or whether the data is publicly accessible, as examples); and
User receives the set of concepts (C2, C3) which impact or are impacted by the input concept with metadata for the properties of the relationship or relationships.

The processing described for the search and identification of variables shown to impact a topic or be impacted by a topic based on statistical evidence provides multiple benefits to a user. As examples, a user may view the connections to other concepts/topics and their metadata to understand the relationships between topics at a high level. A relationship between topics communicates to a user information about the relationship, such as the strength of the relationship, the directionality of the relationship, and information about the sources supporting the relationship. The user is also able to traverse and explore relationships across multiple nodes and better understand the connected system of topics and variables.

In one embodiment, a user provides a query topic/concept and one or more parameters which may interest them in the search of related topics, such as segments of the population (age or location, as examples) they wish to investigate. These inputs can be used to refine or constrain the search to only retrieve data sets and relationships of interest, such as a specific population or other selection criteria represented by metadata associated with a source data set. The inputs may also be used to filter the retrieved data and information to constrain a revised Feature Graph to only represent the topics and variables based on the desired set of source data. The supporting associations of a Feature Graph are provided by user input and system or platform generated associations, which includes metadata for the variables, data, and concepts (e.g., how data is measured, where it is sourced, or how the association was derived). The output provided to the user is a collection of related topics/concepts and metadata between topics such as direction, strength, sourcing, or distance from the original query topic.

In some embodiments, a form of metric monitoring may be used to enhance a user's understanding of the data sources and the topics of interest by providing statistical context that is regularly (e.g., continuously) updated. A Feature Graph shows relationships between variables, and a monitoring function may use the connected data sources to illustrate to a user how changes in variables of interest affect each other. This allows the user to predict changes in key measures, gauge the effectiveness of programs or interventions, and generate testable hypotheses of causation. Metric monitoring combined with the ability to select and filter relevant populations allows the user to distinguish differences in relationships and levels/changes in data between groups.

Improving search capabilities through the automated or semi-automated extraction of statistical information and associated metadata from documents, and establishing statistical relationships between topics using Large Language Models may include the following stages:
  Identify sources of statistical associations (journal articles, documents, other publications) for use in training one or more models;
  Train or "fine tune" one or more machine learning models or transformer-based language models to recognize various statistic types (e.g., odds ratio) and the associated dependent and independent variables;
    This may include use of metadata relating to the strength and quality of an association (e.g., statistical values, statistical type, or significance) based on commonly used statistical terms and formatting in a document;
    This may include dependent and independent variables being referenced by an association and the implied directionality;
    This may include Information about the population that was studied to infer or deduce an association;
    This may include use of metadata relevant to sourcing and categorizing the data supporting a relationship;
    This may include concepts/topics semantically related to the dependent and independent variables in the context of a document and its metadata;
    In one embodiment, different study types use different Large Language Models which are trained on similar publications, typically using the abstract and full text as analyzed by a Natural Language Processing (NLP) model (e.g., spaCy or GPT-3) to extract relevant components. These are initially trained using human provided ground truth labels of the components in the text body. The resulting model is able to label these components from subsequent documents and output labels for the components and confidences in the correctness of the assigned label. The resulting labels can be used for a Feature Graph directly or as features for other labeling models;

As an example, human labels of abstracts and full text may be used to identify where a document specifies statistic values (e.g., 0.4), statistic type (e.g., Odds Ratio, or Hazard Ratio), and significance and confidence intervals (e.g., $p<=0.05$, or (0.1, 0.5) for a confidence interval). A model then ingests other abstracts and text to generate an output of the values/labels for these components based on the training data sets of sentence structure and patterns;

Dependent and independent variables in the document may also be labeled by humans and used as training data. This can be in various positions in the text (e.g., "Variable A vs. a Control's effect on Variable B was measured to be an odds ratio of 1.3", "Variable A was measured to influence Variable B. From our results, we found the odds ratio to be 1.3"). After training, a model can identify the independent and dependent variables (or correlation between variables) based on the sentence structure and statistic type;

Human labels may also be used to train models for to identify and extract metadata of interest in the text of a document. For example, labeling the populations or study metadata (e.g., age of subjects, sample size, or location) allows a model to be trained on and output information regarding metadata which can be associated with the relationship or the data supporting it;

By using identified or labeled variables and metadata for a document, as well as from the text of the document, a model can be trained to recognize the relevant topics connected to the variables. This output of a model is used to semantically connect variables to topics;

Continually execute/train the Large Language Model(s) on existing and emerging sources of information;

Improve the breadth, depth, and statistical rigor available to a user through ingestion of a wide(r) variety of sources; and Store the identified and extracted data, information, and metadata in a database from which it may be accessed to generate a Feature Graph.

Auto-generating a meta-analysis of the relationship between a pair of topics, between a topic and a variable, or between two variables based on statistical evidence gathered from literature, datasets, and machine learning models may include the following stages:

As described with reference to the topic search process to discover/identify the factors (variables or parameters) that have been shown to impact a topic or be impacted by it based on statistical evidence, an aggregation algorithm may be used to process data from the supporting data and information to create comparable measures of strength, direction, and sign of a relationship, and to provide a connection to the supporting variables and associations (across one or multiple sources or topics). The topic relationships are substantiated by the underlying associations and those associations are connected to variables (and thus to datasets and sources) which can be used to answer questions an investigator/user may be interested in;

These questions may include one or more of the following:

Concerning the evidence/supporting data:
Using an existing understanding of statistical values or the system database to compare values across the platform to form a standardized strength metric;

Agreement/disagreement can be measured by agreement of strength, direction, or sign (as examples) through analysis of the distribution of the variable associations underlying a relationship;

By using the connection to the underlying (supporting) associations, the system/platform can filter based on populations of the data supporting an association and can recalculate properties to see how they change given different population segments;

Represent a more specific population segment using the population over time to represent the time evolution of a relationship using time series data;

Examining the sources or related metadata on the associations can be used to identify key terms;

By exposing specific values regarding an association (such as statistical values and their types), a user can better identify risks or uncertainties that may impact a decision;

Concerning the research process used to generate the source data and information:
Aggregating the underlying associations and their connected sources with the relevant metadata enables identifying the populations studied across topics;

Similarly, author metadata from sources may be used to indicate who has studied a topic;

Similarly, study metadata on recency/publication date may be used to determine the recency and hence applicability (staleness) of a study;

Similarly, a study methodology may be identified from metadata and references cited in a study;

Aggregating the sources and using algorithms or techniques for determining completeness of the data, processing may surface measures of the quality of research represented by a source. This may use a combination of known measures of quality (e.g., impact factor of the source journal, or availability of open data for reproducibility), as well as system or platform measures for information completeness (e.g., an evaluation of the metadata provided in the system or platform database) to determine a composite measure of source quality;

Relative amount of coverage of a topic by the system or platform may be provided using measures of how much is known to be studied for one or more topics (by searching open data sources for available research), and comparing it with the amount of data and information available to the system or platform;

As part of this analysis, "key" journals may be sourced and compared with the metadata of the sources of the substantiating associations being used to populate the system or platform database and hence the generated Feature Graphs.

Figure 3C:
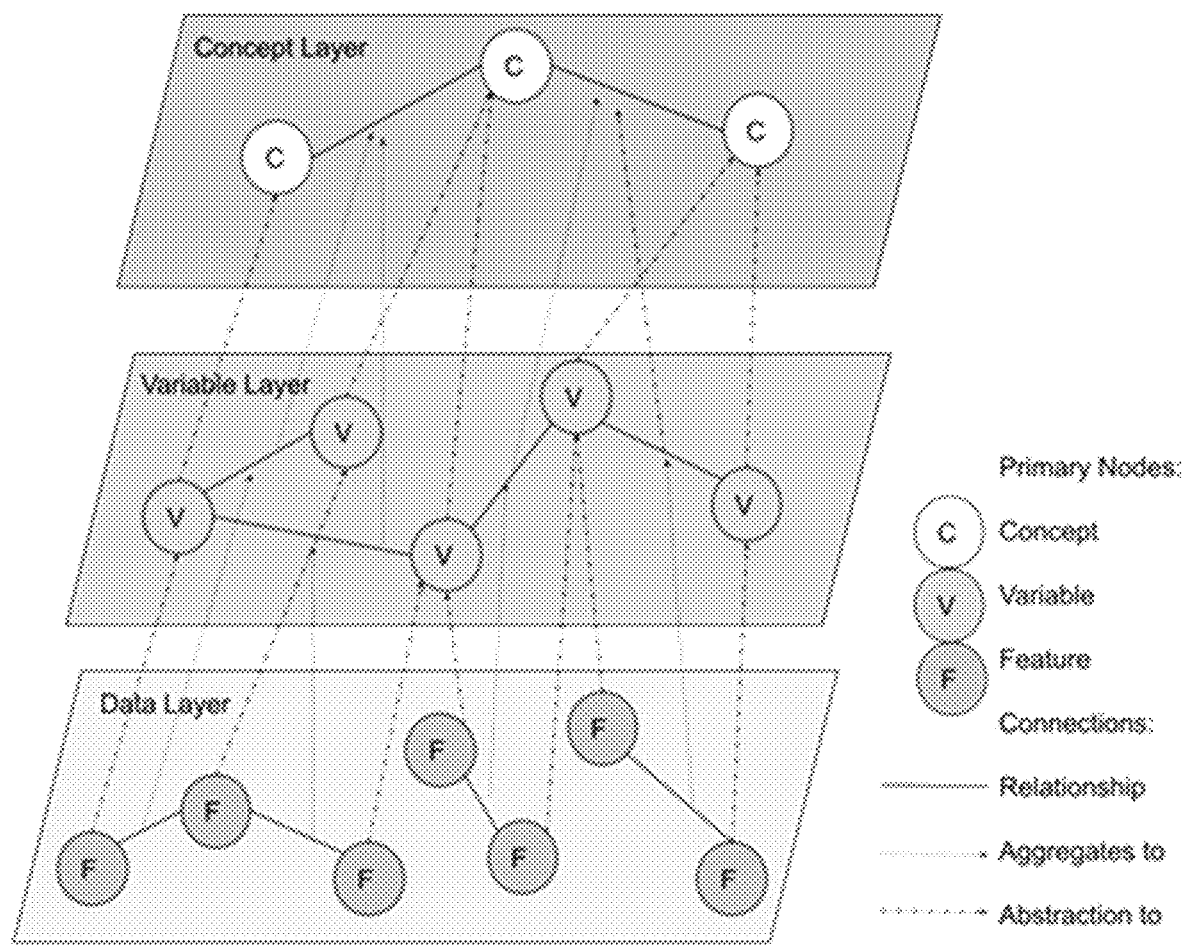
FIG. 3(C) is a diagram illustrating the splitting or separation of the concepts/topics, variables, and data of a Feature Graph into separate layers.

Enabling a user to visually navigate a large knowledge base of statistically-related information across multiple resolutions of information (e.g., from topics to metrics to features) may include the following stages:

- Generate a Feature Graph illustrating statistical associations between variables, the data supporting these associations, and topics which are semantically related to the variables;
- Split the data into separate layers of abstraction (e.g., data, variables, or topics/concepts), as suggested by FIG. 3(C), which is a diagram illustrating the splitting or separation of the concepts/topics, variables, and data of a Feature Graph into separate layers;
- Aggregate the underlying categories of topics/concepts, variables, and data (features) into separate layers, providing the ability to generate a graph view of relationships at each layer of abstraction;
  - Traversal of a graph within a layer allows a user to explore relationships between primary nodes of each layer (e.g., features, variable, or topics/concepts);
  - The hierarchy of abstraction between layers allows a user to drill down into higher resolutions of data and statistical information or move up to a more holistic view of the graph and what topics are relevant to the underlying data or information;
- A visualization of the layers and the relationships can be shown together or in subsets to give a sense of the entire system or of a smaller subsystem and its place in the full graph;
- Properties (or values) of an underlying association or metadata generated by an aggregation technique may be displayed on a graph to aid in understanding the relationships between nodes or groups of nodes.

Splitting the data and information into layers may be performed using the structure of the data model and determining break points and primary nodes for each layer. In one example case, the concepts/topics, variables, and features may be used to construct each layer and their nodes, with connections between primary nodes at each layer and between layers. A visualization is generated using graphing techniques to display a graph of each layer and connect them together.

Splitting and visualizing relationships across multiple layers is beneficial because each layer represents a different level of abstraction of the underlying data. This allows a user to focus on each layer separately and as part of a combined multi-layer structure by showing connections across layers at each node so that the user can understand how each node is substantiated by a lower level or how it abstracts to a higher level. This allows a more natural understanding of a relationship, its source, and what higher level concepts it relates to.

Figure 3D:
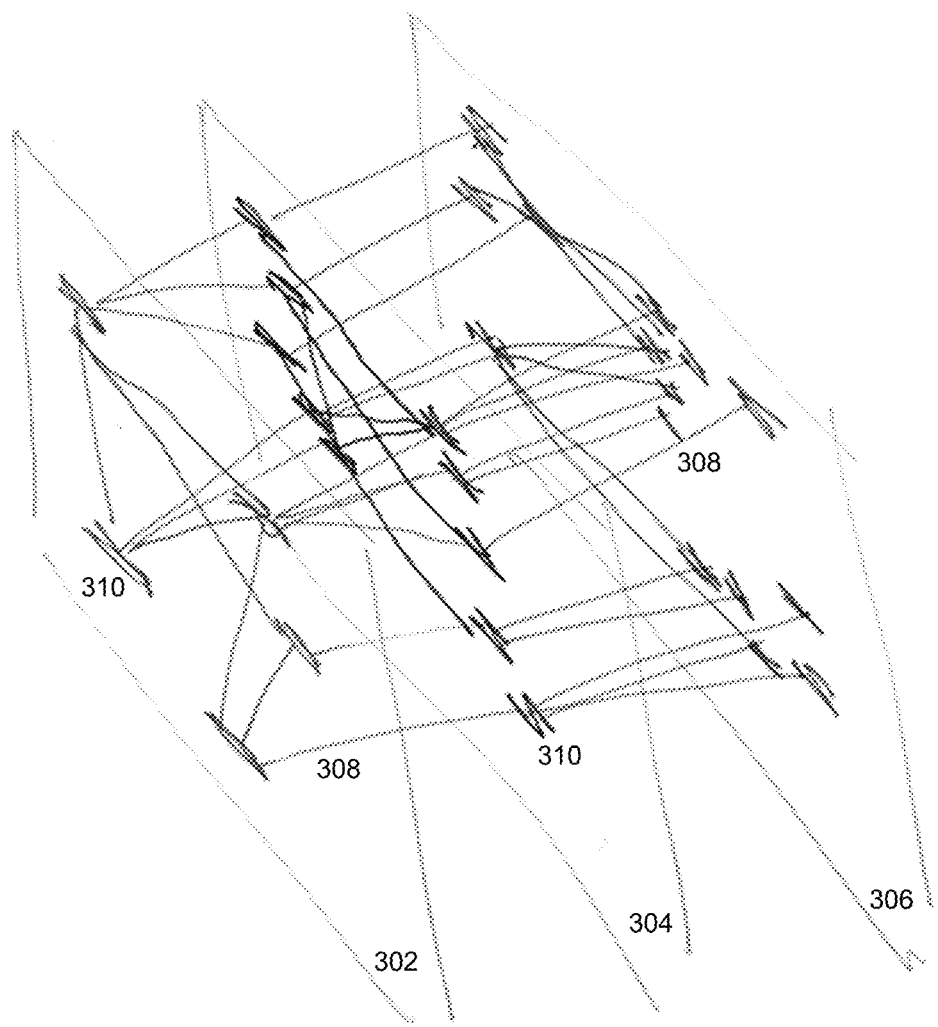
FIG. 3(D) is a diagram illustrating a view of a set of layers generated by splitting the data and information used to generate a Feature Graph into the categories of topic, variable, and data, with each category placed into a separate layer and with connections between nodes in the same or different layer indicated.

FIG. 3(D) is a diagram illustrating a view of a set of layers generated by splitting the data and information used to generate a Feature Graph into the categories of topic, variable, and data, with each category placed into a separate layer and with connections between nodes in the same or different layer indicated. As shown in the figure, each of the three layers (e.g., topic/concept 302, variables/parameters 304, and data 306 may connect or be associated by an edge 308 with a node 310 in the same or a different layer.

Figure 3E:
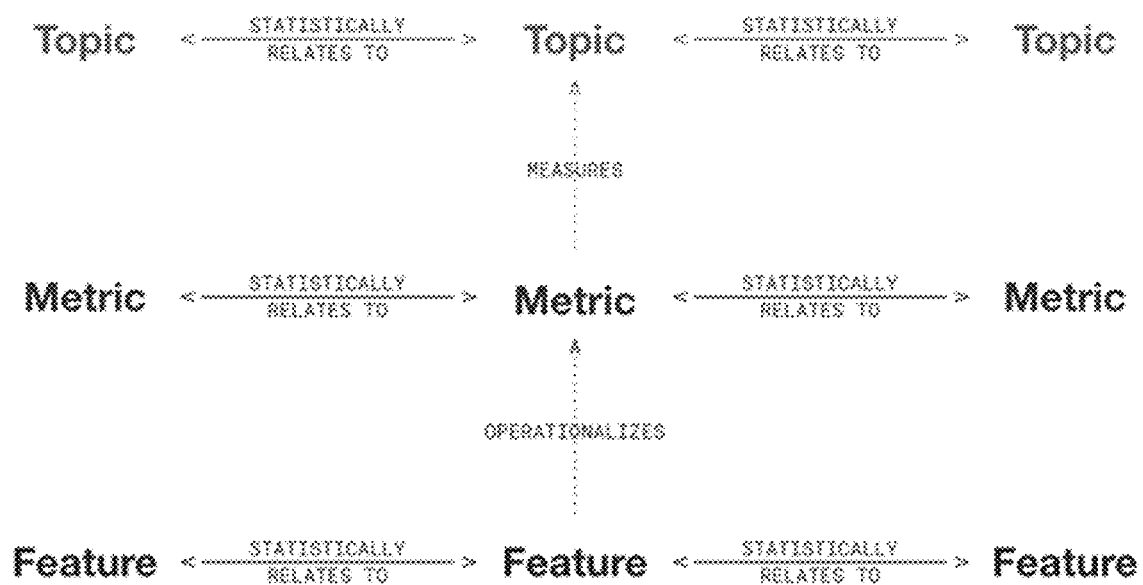
FIG. 3(E) is a diagram illustrating an example of a relationship between a feature or features in one layer, a metric or measure that associates a feature with a second layer of related metrics (and in particular with a specific metric), and a relationship between the specific metric and a topic in a layer of related topics.

FIG. 3(E) is a diagram illustrating an example of a relationship between a feature or features in one layer, a metric or measure that associates a feature with a second layer of related metrics (and in particular, with a specific metric), and a relationship between the specific metric and a topic in a layer of related topics. In one sense, a feature is an operationalized metric. For example, a "patient's BMI" is a variable, and a corresponding feature would be when this variable is measured on 20 patients in a specific hospital, with that set of 20 data points representing a feature on the platform. A metric may be operationalized with multiple features (e.g., different hospitals in this example). The same feature could be used as an input into a statistical model (e.g., an ML model); for example, one may want to measure the impact of patients' BMI on their length of hospitalization. This association will be modeled between two features on the platform. Since those two features are connected to their corresponding metrics, the association also shows up between the two variables. Thus, as suggested by the figure, a feature may be statistically associated with other features and be data used to generate a specific metric or variable value represented in a different layer (where that layer contains a set of metrics that are statistically related to one another). The specific metric may be relevant to a topic by representing a measure of a characteristic of the topic, where the topic is represented in a layer of statistically related topics.

Figure 3F:
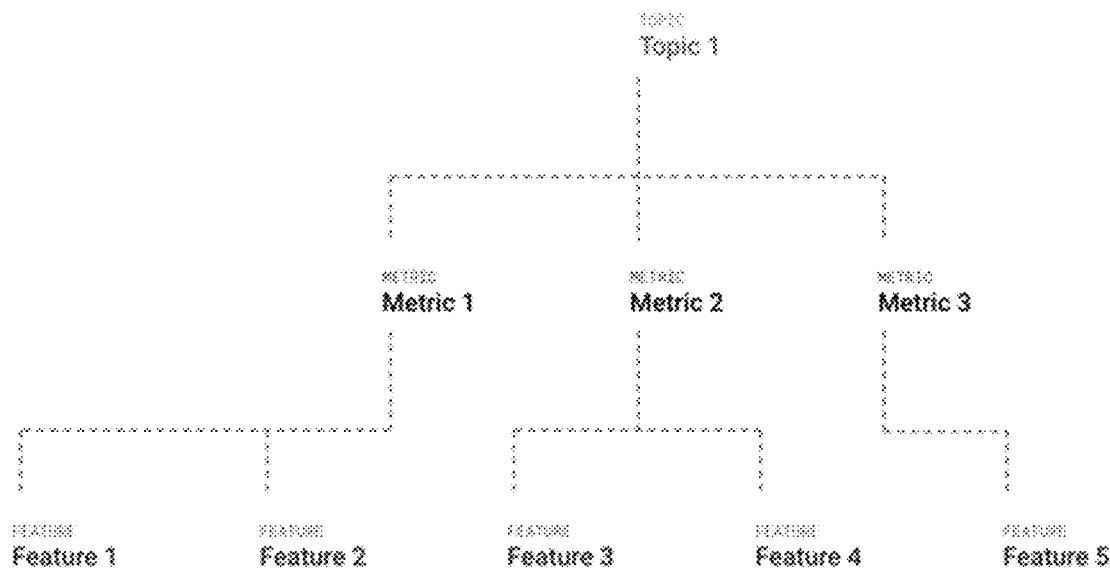
FIG. 3(F) is a diagram illustrating a more complex example of a relationship of the type shown in FIG. 3(E)

FIG. 3(F) is a diagram illustrating a more complex example of a relationship of the type shown in FIG. 3(E). In this example, one or more features in a layer are associated with (e.g., used to generate a value for) a metric in a different layer, with one or more metrics being associated with a topic in another layer. As shown in the figure, in this example, Feature 1 and Feature 2 in one layer are associated with Metric 1 in another layer, which is associated with Topic 1 in another layer. Topic 1 is associated with multiple metrics, each of which are associated with different Features.

Figure 3G:
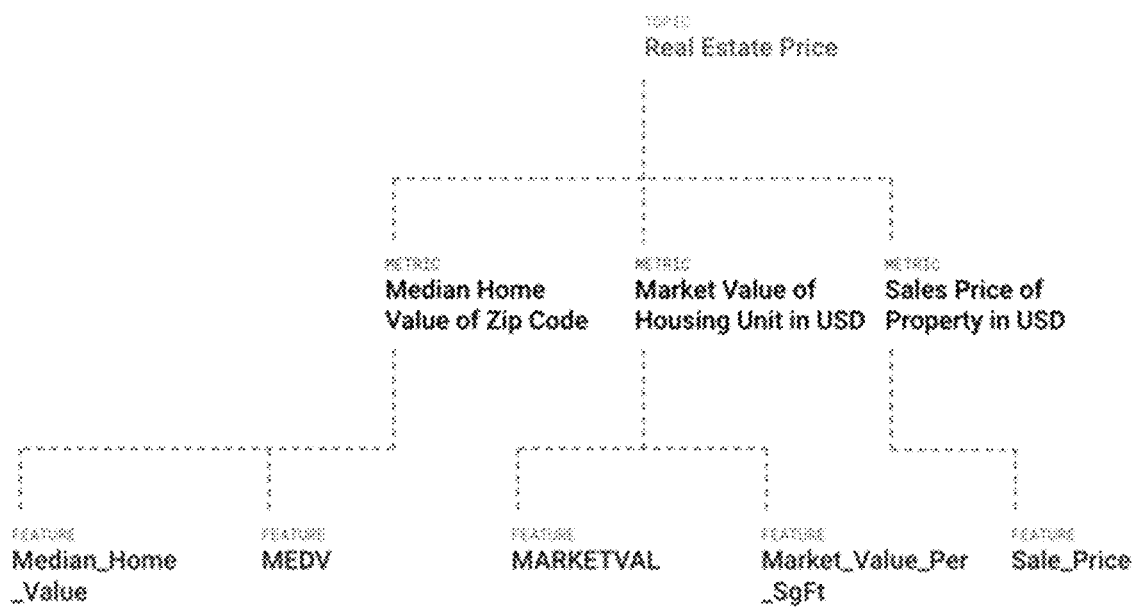
FIG. 3(G) is a diagram illustrating an example of how specific features and metrics may relate or be associated to a topic (as illustrated in FIG. 3(F)) for real-world data.

FIG. 3(G) is a diagram illustrating an example of how specific features and metrics may relate or be associated to a topic (as illustrated in FIG. 3(F)) for real-world data. As shown in the figure, based on sources that have been processed and represented as a Feature Graph, a user may observe that specific features (e.g., market value and market value per square foot) may be statistically associated with a specific metric (e.g., market value of housing unit), with that metric being associated with a topic (e.g., real estate price).

Figure 3H:
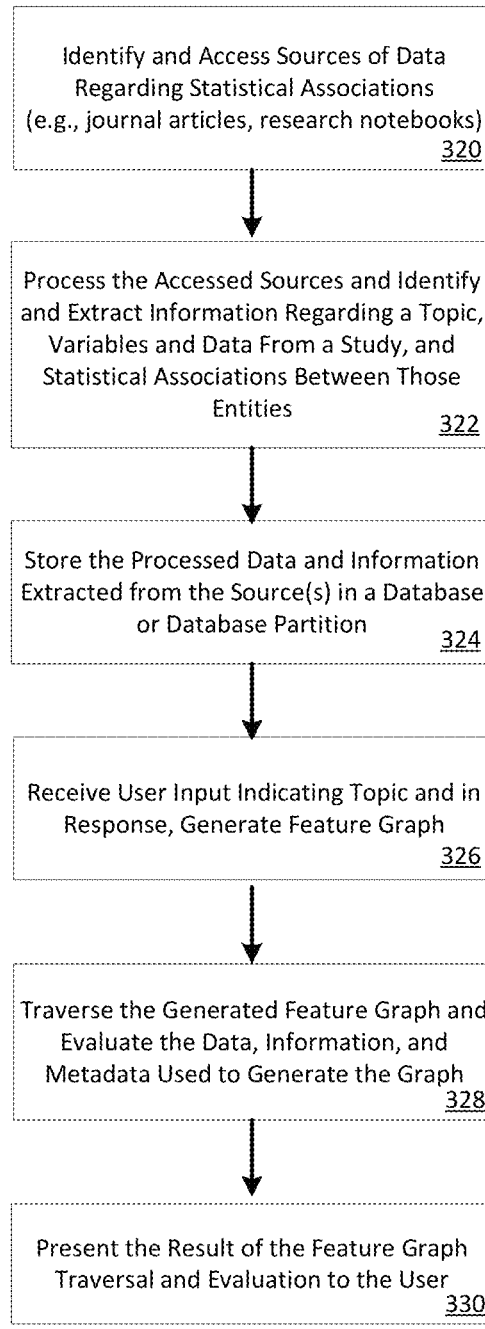
FIG. 3(H) is a flow chart or flow diagram illustrating a process, method, function, or operation that may be used to implement an embodiment of the disclosed system and methods.

FIG. 3(H) is a flow chart or flow diagram illustrating a process, method, function, or operation that may be used to implement an embodiment of the disclosed system and methods. In one embodiment, this may include the steps or stages of:

- Identifying and accessing source data and information (as suggested by step or stage 320);
  - In one embodiment, this may represent publicly available data and information from journals, research periodicals, or other publications describing studies or investigations;
  - In one embodiment, this may represent proprietary data and information, such as experimental results generated by an organization, research topics of interest to the organization, or data collected by the organization from customers or clients;
- Processing the accessed data and information (as suggested by step or stage 322);
  - In one embodiment, this may include the identification and extraction of information regarding one or more of a topic of a study or investigation, the variables or parameters considered in the study or investigation, and the data or datasets used to establish a statistical association between one or more variables and/or between a variable and the topic, along with a measure of the statistical association(s) in the form of a metric or similar quantity;
- In one embodiment, this processing may be performed automatically or semi-automatically by use of a trained model that utilizes a language model or language embedding technique to identify data and information of interest or relevance;

Storing the processed data and information in a database (as suggested by step or stage 324);
- In one embodiment, the database may include one or more partitions to isolate data obtained from an organization, from a set of sources, or from a set of populations into a separate dataset to be used to generate a Feature Graph;
  - This may be a useful approach where a set of data is obtained from a proprietary study, a specific population, or is otherwise subject to regulation or constraints (such as a privacy or security regulation);
- In some embodiments, the processed data and information may be stored in accordance with a specific data schema that includes specific labels or fields;

Receiving a user input indicating a topic of interest and in response, generating a Feature Graph (as suggested by step or stage 326);
- In one embodiment, the user input may specify sources, thresholds, or other forms of constraints that are used as filtering mechanisms for the data and information used to generate the Feature Graph;

Traversing the Feature Graph, and evaluating the data, information, and metadata used to generate the Feature Graph (as suggested by step or stage 328);
- This may include filtering the data and information represented by the Feature Graph in accordance with a rule, constraint, threshold, or other condition prior to the evaluation process;
- This may include evaluating the data, information, and metadata in a processing flow determined by a specific application or set of controls/instructions;
  - In one embodiment, this may include aggregating statistical data and/or metadata, identifying statistically relevant or significant relationships, or generating specified metrics or indicia of relationships or variable values, as non-limiting examples;
  - In one embodiment, this may include evaluating the aggregated data using a rule-set or condition to identify potentially important variables or relationships, or to alert a user to a specific condition;
  - In one embodiment, this may include performing a type of network analysis on the nodes in a layer; and Presenting the results of the graph traversal and evaluation to a user (as suggested by step or stage 330);
- In one embodiment, this may include separating the topic(s), variables, and data used to generate the Feature Graph into distinct layers of nodes and connecting edges between nodes and layers;
- In one embodiment, this may include indicating to the user a relationship between two nodes having certain characteristics (such as strength, recency, exceeding a threshold value, or being more reliable, as examples);
- In one embodiment, this may include presenting a list or table to the user specifying concepts/topics which impact or are impacted by the input concept/topic with metadata for the properties of this relationship;
- In one embodiment, this may include associating a set of variables or a topic with a metric and indicating a value and/or change in the metric to the user;
- In one embodiment, this may include representing a relationship between two variables, between two topics, or between a variable and a topic using one or more metrics or indicia (e.g., flags, alerts, or colors) regarding the statistical relationship between those entities; and
- In one embodiment, this may include generating a virtual reality or similar experience to allow the user to navigate through a Feature Graph's nodes and layers.

Another embodiment of the disclosed system and methods enables a user to leverage the database of data and information extracted from sources to assist in understanding, modeling, and visualizing the world, or parts of the world, as a complex system. For example, through data visualization applications, virtual reality or augmented reality applications, or immersive installations, a user could navigate the complex interdependencies within a particular neighborhood of a topic or category. As another example, by leveraging the statistical associations in a neighborhood of a topic, a user could study and model the dynamics of a particular system and compare those dynamics across various populations.

Another embodiment of the disclosed system and methods enables a user to leverage the database of data and information extracted from sources or a Feature Graph to perform network analysis on a given subgraph and to enable link prediction. For example, an application could allow a user to select certain forms of statistical associations, generate a subgraph containing those associations in a specific domain, and then measure network properties such as centrality (for example, to understand the centrality of variables in a public health system). As another example, a user could leverage the information and data in a Feature Graph about the edges linked to a given node to predict edges for a similar node:
- in this use case, a user could leverage the knowledge contained in a Feature Graph about the associations between a variable A and other variables in a given population to make predictions about the associations between a certain variable B that is materially similar to variable A (where such materiality may be determined by a priori knowledge about the nature of the variables in question, e.g., the shape of a molecule and the relevance to its impact on the body).

Another embodiment of the disclosed system and methods enables a user to leverage the database of data and information extracted from sources or a Feature Graph to assist in inferring causal relationships, where a key challenge is identifying potential confounders. This may be based on a recognition that the technical process of causal inference at large scale may be significantly improved through collective intelligence, that is, specifically by leveraging the unprecedented volume, richness, and diversity of associations contained in the system or platform database that are sourced from a diversity of experiments and studies, across various populations, and contributed by different users.

For example, a researcher studying a particular topic can search the platform database for that topic to determine which factors have been shown to have a significant impact on the topic, and which factors have been shown to have a non-significant impact on the topic. In so doing, the researcher can develop a causal diagram of the topic, incorporating their own findings and the results they gathered from the platform to infer the (potential) causality of the topic. This can be very beneficial, as conventionally, a researcher has no systematic way of gathering all known factors impacting a topic because of a lack of a search tool to support causal inference.

Another embodiment of the disclosed system and methods may enable a user to leverage the database of data and information extracted from sources or a Feature Graph to guide investment decisions. For example, a user may use the database to consider the unintended consequences of a particular financial event (for example, a change in the price of a given commodity) to hedge an investment.

As another example, a grant-making organization can leverage the capabilities of the platform to identify areas that would benefit from investment, beyond the traditional silos that are conventionally considered. This may result from surfacing a new hypothesis for how to intervene in an area and drive a positive outcome and the grantor funds that experiment, or because the platform surfaces central nodes or important edges that lack data or evidence in a particular context (e.g., a country), and the grantor funds data collection or research.

In a general use case, a user submits an identifier for a topic or interest to the disclosed system or platform. The user may also submit a description of one or more filters to be used to select a set of sources or data for use in generating a Feature Graph. The sources may be those available publicly, those from a specific type or category of sources, those from a set of proprietary documents or studies (which may be stored in a separate partition or section of the system or platform database), those discussing data obtained from a specific population, or other description of a category of sources or constraint on relevant sources.

The system or platform then accesses the database or identified partition of the database (or in some cases, a separate and user-specific database) and generates a Feature Graph. The data and information used to generate the Feature Graph and/or associated metadata may be processed to provide aggregated measures of statistical significance, categories of data types or sources, and one or more forms of visualizations to enable a user to investigate the relationships described by the sources. A user may select a dataset associated with a node of the Feature Graph for use in training a model or for purposes of a further investigation. A task-specific application may be created to traverse a Feature Graph and identify topics, variables, or datasets of interest for purposes of investigating the impact of one variable on another, one topic on another, or a variable on a topic.

Figure 4:
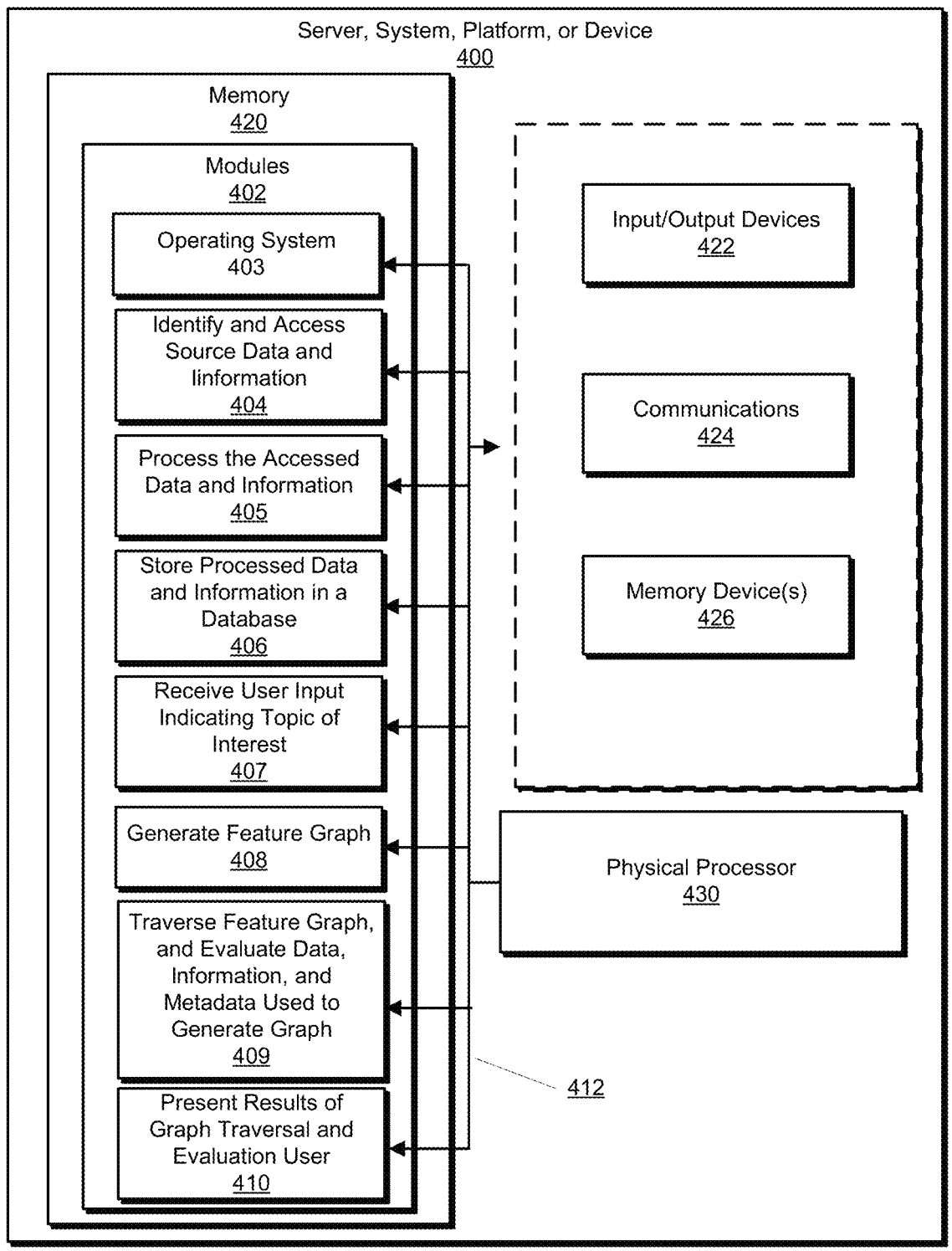
FIG. 4 is a diagram illustrating elements or components that may be present in a computer device or system configured to implement a method, process, function, or operation in accordance with an embodiment of the invention.

FIG. 4 is a diagram illustrating elements or components that may be present in a computing device or system configured to implement a method, process, function, or operation in accordance with an embodiment of the disclosure. As noted, in some embodiments, the disclosed system and methods may be implemented in the form of an apparatus, system or device that includes a processing element and set of computer-executable instructions. The executable instructions may be part of a software application and arranged into a software architecture and stored in (or on) a non-transitory computer-readable medium.

As shown in FIG. 4, system 400 may represent a server or other form of computing or data processing device. Modules 402 each contain a set of executable instructions, where when the set of instructions is executed by a suitable electronic processor (such as that indicated in the figure by "Physical Processor(s) 430"), system (or server or device) 400 operates to perform a specific process, operation, function, or method. Modules 402 may contain one or more sets of instructions for performing a method or function described with reference to the Figures, and the descriptions of the functions and operations provided in the specification. These modules may include those illustrated but may also include a greater number or fewer number than those illustrated. Further, the modules and the set of computer-executable instructions that are contained in the modules may be executed by the same processor or by more than a single processor.

Modules 402 are stored in a memory 420, which typically includes an Operating System module 403 that contains instructions used (among other functions) to access and control the execution of the instructions contained in other modules. The modules 402 in memory 420 are accessed for purposes of transferring data and executing instructions by use of a "bus" or communications line 412, which also serves to permit processor(s) 430 to communicate with the modules for purposes of accessing and executing a set of instructions. Bus or communications line 412 also permits processor(s) 430 to interact with other elements of system 400, such as input or output devices 422, communications elements 424 for exchanging data and information with devices external to system 400, and additional memory devices 426.

In general, an embodiment of the invention may be implemented using a set of software instructions that are designed to be executed by a suitably programmed processing element (such as a CPU, microprocessor, processor, GPU, TPU, controller, or other computing device, as non-limiting examples). In a complex application or system such instructions are typically arranged into "modules" with each such module typically performing a specific task, process, function, or operation. The entire set of modules may be controlled or coordinated in their operation by an operating system (OS) or other form of organizational platform. Each application module or sub-module may correspond to a particular function, method, process, or operation that is implemented by the module or sub-module. Such function, method, process, or operation may include those used to implement or represent one or more aspects of the inventive system and methods (including, but not limited to those described with reference to the Figures).

For example, an application module or sub-module may contain software instructions which when executed cause a system or apparatus to perform one or more of the following operations or functions:
  Identify and access source data and information (as suggested by module 404);
  Process the accessed data and information (module 405);
  Store the processed data and information in a database (module 406);
  Receive a user input indicating a topic of interest (module 407);
  In response to the received user input, generate a Feature Graph (module 408);
  Traverse the Feature Graph, and evaluate the data, information, and metadata used to generate the Feature Graph (module 409); and
  Present the results of the graph traversal and evaluation to a user (module 410).

The application modules and/or sub-modules may include any suitable computer-executable code or set of instructions (e.g., as would be executed by a suitably programmed processor, microprocessor, GPU, or CPU), such as computer-executable code corresponding to a programming language. For example, programming language source code may be compiled into computer-executable code. Alternatively, or in addition, the programming language may be an interpreted programming language such as a scripting language.

As described, the system, apparatus, methods, processes, functions, and/or operations for implementing an embodiment of the disclosure may be wholly or partially implemented in the form of a set of instructions executed by one or more programmed computer processors such as a central processing unit (CPU), GPU or microprocessor. Such processors may be incorporated in an apparatus, server, client or other computing or data processing device operated by, or in communication with, other components of the system.

As mentioned, the methods, processes, function, or operations described with reference to the Figures may be implemented as a service for one or more users or sets of users. In some embodiments, this service may be provided through use of a service platform which is operable to provide services for multiple customers, with each customer having a separate account. Such a platform may have an architecture similar to a multi-tenant platform or system, which may be referred to as a SaaS (software-as-a-Service) platform. An example architecture of such a platform is described with reference to FIG. 5.

Figure 5:
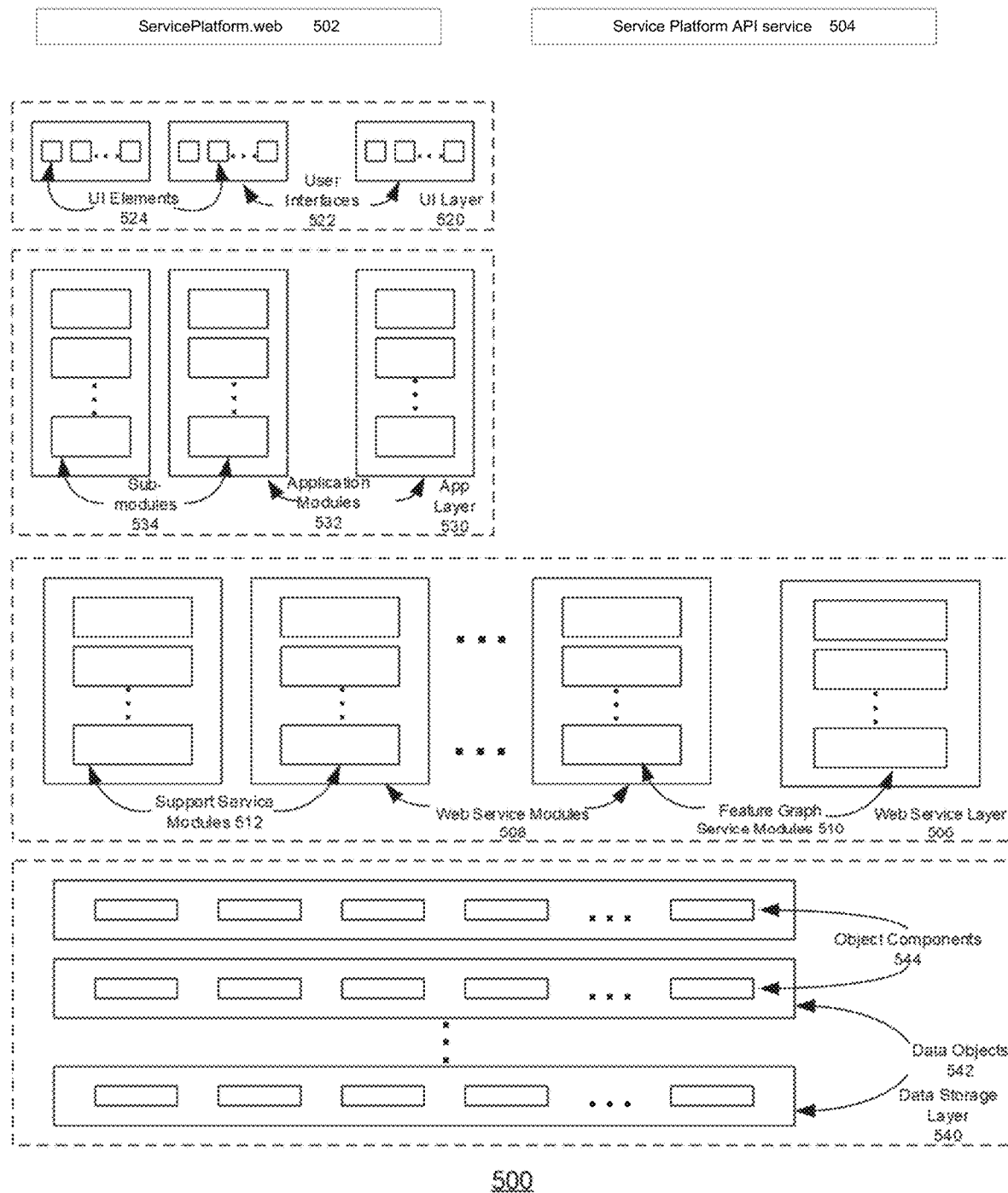
FIG. 5 is a diagram illustrating an example system architecture for a service platform that may be used in implementing an embodiment of the systems and methods described herein.

FIG. 5 is a diagram illustrating an example system architecture 500 for a service platform that may be used in implementing an embodiment of the systems and methods described herein. In some embodiments, a service platform (a multi-tenant or other "cloud-based" system) which provides access to one or more of data, applications, and data processing capabilities includes a website (e.g., ServicePlatform.com), an API (Restful web service), and other support services; the website operation follows a standard MVC (model-view-controller) architecture:

Models—model objects are the parts of the application that implement the logic for the application's data domain. Often, model objects retrieve and store model state in a database. For example, a Bill object might retrieve information from a database, operate on it, and then write updated information back to a Bills table in a SQL Server database;

Views—views are the components that display the application's user interface (UI). Typically, this UI is created from the model data. An example would be an edit view of a Bills table that displays text boxes, drop-down lists, and check boxes based on the current state of a Bill object; and Controllers—controllers are the components that handle user interaction, work with the model, and ultimately select a view to render that displays UI. In an MVC application, the view only displays information; the controller handles and responds to user input and interaction. For example, the controller handles query-string values, and passes these values to the model, which in turn might use these values to query the database.

In one embodiment, the Serviceplatform.com website (element, component, or process 502) provides access to one or more of data, data storage, applications, and data processing capabilities. The applications or data processing capabilities or functionality may include but are not necessarily limited to one or more of the data processing operations described with reference to Figures. The website architecture may be based on a standard MVC architecture, and its controller utilizes the API web service (element, component, or process 504) to interact with the service processes and resources (such as models or data) indirectly. The API web service is composed of web service modules (element, component, or process 508) and one or more that execute an embodiment of the process(es) or functionality disclosed herein, that is a Feature Graph construction and search (or other application) service module (element, component, or process 510). When receiving a request, either directly from a service user or from the Serviceplatform.com Controller, the web service module (508) reads data from the input and launches or instantiates service module (510). Both the Web Service Modules 508 and the Feature Graph Service Modules 510 may be part of a Web Service Layer 506 of the architecture or platform.

The API Service may be implemented in the form of a standard "Restful" web service, where RESTful web services are a way of providing interoperability between computer systems on the Internet. REST-compliant Web services allow requesting systems to access and manipulate textual representations of Web resources using a uniform and predefined set of stateless operations.

With reference to FIG. 5, as mentioned, an embodiment of the process or processes described with reference to the Figures may be accessed or utilized via either a service platform website 502 or a service platform API 504. The service platform will include one or more processors or other data processing elements, typically implemented as part of a server. The service platform may be implemented as a set of layers or tiers, including a UI layer 520, an application layer 530, a web services layer 506, and a data storage layer 540. User Interface layer 520 may include one or more user interfaces 522, with each user interface composed of one or more user interface elements 524.

Application layer 530 is typically composed of one or more application modules 532, with each application module composed of one or more sub-modules 534. As described herein, each sub-module may represent executable software instructions or code that when executed by a programmed processor, implements a specific function or process, such as those described with reference to the Figures.

Thus, each application module 532 or sub-module 534 may correspond to a particular function, method, process, or operation that is implemented by the module or sub-module (e.g., a function, method, process, or operation related to providing certain functionality to a user of the platform). Such function, method, process, or operation may include those used to implement one or more aspects of the disclosed system and methods, such as by:

Identifying and accessing source data and information;
Processing the accessed data and information;
Storing the processed data and information in a database;
Receiving a user input indicating a topic of interest;
In response to the received user input, generating a Feature Graph;
Traversing the Feature Graph, and evaluating the data, information, and metadata used to generate the Feature Graph; and
Presenting the results of the graph traversal and evaluation to a user.

In some embodiments, the modules of FIG. 4 and/or the application modules 532 or sub-modules 534 of FIG. 5 may correspond to a process or processes for generating a Feature Graph using a specific order of operations with specific relationships of interest. An example of such a process is the following for the example of identifying potentially relevant datasets:

Generating a user interface to enable a user to input a search term or concept (e.g., C1 of FIG. 3(A)) for initiating a statistical search and/or a semantic search, and/or one or more controls for a search;

Determining a concept (C2) that is semantically associated with C1 (this may be an optional feature and based on access to a suitable ontology or reference);

Determining variables ($V_X$) that are semantically associated with C1 and/or C2 by executing a search over a generated Feature Graph;

Determining variables that are statistically associated with each of the variables $V_X$ by executing a search over the Feature Graph;

Determining a measure or measure of the strength or other indicia of the identified statistical association(s) indicated by the Feature Graph;

Identifying datasets that measure each of the variable $V_X$ and/or that demonstrate or support the statistical association(s) of the variables that are statistically associated with each of the variables $V_X$; and Presenting to the user a ranking or listing of the identified datasets, with such ranking or listing being subject to filtering by one or more user specified criteria (if desired).

Note that in addition to the operations or functions listed, an application module 532 or sub-module 534 may contain computer-executable instructions which when executed by a programmed processor cause a system or apparatus to perform a function related to the operation of the service platform. Such functions may include but are not limited to those related to user registration, user account management, data security between accounts, the allocation (load balancing) of data processing and/or storage capabilities, providing access to data sources other than SystemDB (such as ontologies or reference materials, as non-limiting examples).

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server may include each application module. Alternatively, different application servers may include different sets of application modules. Such sets may be disjoint or overlapping.

Similarly, Web service layer 506 may be composed of one or more web service modules 508, again with each module including one or more sub-modules (and with each sub-module representing executable instructions that when executed by a programmed processor, implement a specific function or process). For example, web service modules 508 may include modules or sub-modules used to provide support services (as suggested by support service-modules 512) and to provide the functionality associated with the service and processes described herein (as suggested by Feature Graph Service Modules 510).

Data storage layer 540 may include one or more data objects 542, with each data object composed of one or more object components 544, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

The architecture of FIG. 5 is an example of a multi-tenant architecture which may be used to provide access to users to various data stores and executable applications or functionality (sometimes referred to as providing Software-as-a-Service (SaaS)). Although FIG. 5 and its accompanying description are focused on a service platform for providing the functionality associated with the processes described with reference to the Figures, a more generalized form of a multi-tenant platform may be used that includes the capability to provide other services or functionality. For example, the service provider may also provide a user with the ability to conduct certain data analysis, billing, account maintenance, scheduling, eCommerce, ERP functionality, CRM functionality, etc.

The example computing environments depicted in the Figures are not intended to be limiting examples. Alternatively, or in addition, computing environments in which an embodiment of the invention may be implemented include any suitable system that permits users to provide data to, and access, process, and utilize data stored in a data storage element (e.g., a database) that can be accessed remotely over a network. Further example environments in which an embodiment of the invention may be implemented include devices (including mobile devices), software applications, systems, apparatuses, networks, or other configurable components that may be used by multiple users for data entry, data processing, application execution, data review, etc. and which have user interfaces or user interface components that can be configured to present an interface to a user. Although further examples may reference the example computing environment depicted in the Figures, it will be apparent to one of skill in the art that the examples may be adapted for alternate computing devices, systems, apparatuses, processes, and environments. Note that an embodiment of the inventive methods may be implemented in the form of an application, a sub-routine that is part of a larger application, a "plug-in", an extension to the functionality of a data processing system or platform, or any other suitable form.

The disclosure includes the following clauses and embodiments:

1. A computer-executed method, comprising:
    accessing data and information for a set of sources, wherein for each source, the data and information are associated with a study;
    for each source, processing the accessed data and information to identify a topic of the study, a set of variables considered in the study, and to identify information regarding a statistical association between one or more of the set of variables and the topic of the study or between two or more of the set of variables;
    storing the processed data and information for each source in a database, the stored data and information including a reference to a topic of the study described in the source, a reference to each of the set of variables considered in the study, and information regarding a statistical association between one or more of the set of variables and the topic of the study or between two or more of the set of variables;
    receiving a user input indicating a topic of interest;
    in response to the received user input, generating a feature graph based on the stored data and information, the feature graph including a set of nodes and a set of edges, wherein each edge in the set of edges connects a node in the set of nodes to one or more other nodes, and further, wherein each node represents one of the topic of interest, a variable found to be statistically associated with the topic of interest, or a topic found to be statistically or semantically associated with the topic of interest, and each edge represents a statistical association between a node and the topic of interest or between a first node and a second node;

traversing the generated feature graph;

evaluating the data and information used to generate the feature graph; and presenting the results of the feature graph traversal and evaluation of the data and information used to generate the feature graph to the user.

2. The method of clause 1, wherein the set of sources includes one or more of journals, publications, published studies or investigations, data collected by an organization, or anecdotal observations.

3. The method of clause 1, wherein for at least one of the set of sources, the method comprises associating a dataset with one of the set of variables or with the topic of the study, the dataset including data demonstrating the statistical association between one or more of the set of variables and the topic of the study or between two or more of the set of variables, or data representing a measure of one or more of the set of variables, and traversing the generated feature graph comprises identifying a dataset or datasets associated with one or more variables that are statistically associated with the topic of interest or are statistically associated with a topic semantically related to the topic of interest.

4. The method of clause 1, wherein processing the accessed data and information for each source further comprises using one or more of optical character recognition, natural language processing techniques, natural language understanding techniques, or trained models to identify and extract information.

5. The method of clause 1, wherein the processed data and information are stored in a partition of the database that is accessible to a specific set of users.

6. The method of clause 1, wherein evaluating the data and information used to generate the feature graph further comprises one or more of filtering, generating a metric reflecting a characteristic of a statistically relevant relationship, applying a threshold value to determine relevance, or generating a set of topics impacted by a variable or variables that impact a topic.

7. The method of clause 6, wherein storing the processed data and information for each source comprises storing metadata regarding the source, the generated feature graph includes the stored metadata, and evaluating the data and information used to generate the feature graph includes evaluating the metadata.

8. The method of clause 1, wherein the results are presented to the user in multiple layers, with a layer corresponding to topics, variables, and data.

9. The method of clause 1, wherein receiving the user input indicating a topic of interest further comprises receiving one or more words in a search area and a selection of an icon associated with a statistical search.

10. The method of clause 1, wherein receiving the user input indicating a topic of interest further comprises receiving one or more control parameters from the user, wherein the control parameters include one or more of a constraint on data, population, quality, methodology, or author of one or more sources.

11. A computer-executed method, comprising:

receiving a user input indicating a topic of interest;

accessing a database containing data and information obtained from processing a set of sources, wherein for each source, the database includes a reference to a topic of a study, a reference to a set of variables considered in the study, and information regarding a statistical association between one or more of the set of variables and the topic of the study or between two or more of the set of variables;

generating a feature graph based on the stored data and information, the feature graph including a set of nodes and a set of edges, wherein each edge in the set of edges connects a node in the set of nodes to one or more other nodes, and further, wherein each node represents one of the topic of interest, a variable found to be statistically associated with the topic of interest, or a topic found to be statistically or semantically associated with the topic of interest, and each edge represents a statistical association between a node and the topic of interest or between a first node and a second node;

traversing the generated feature graph;

evaluating the data and information used to generate the feature graph; and presenting the results of the feature graph traversal and evaluation of the data and information used to generate the feature graph to the user.

12. The method of clause 11, wherein the set of sources includes one or more of journals, publications, published studies or investigations, data collected by an organization, or anecdotal observations.

13. The method of clause 11, wherein for at least one of the set of sources, the method comprises associating a dataset with one of the set of variables or with the topic of the study, the dataset including data demonstrating the statistical association between one or more of the set of variables and the topic of the study or between two or more of the set of variables, or data representing a measure of one or more of the set of variables, and traversing the generated feature graph comprises identifying a dataset or datasets associated with one or more variables that are statistically associated with the topic of interest or are statistically associated with a topic semantically related to the topic of interest.

14. The method of clause 11, wherein evaluating the data and information used to generate the feature graph further comprises one or more of filtering, generating a metric reflecting a characteristic of a statistically relevant relationship, applying a threshold value to determine relevance, or generating a set of topics impacted by a variable or variables that impact a topic.

15. The method of clause 11, wherein the database includes metadata regarding each source, the generated feature graph includes the stored metadata, and evaluating the data and information used to generate the feature graph includes evaluating the metadata.

16. The method of clause 11, wherein the results are presented to the user in multiple layers, with a layer corresponding to topics, variables, and data.

17. The method of clause 11, wherein receiving the user input indicating a topic of interest further comprises receiving one or more control parameters from the user, wherein the control parameters include one or more of a constraint on data, population, quality, methodology, or author of one or more sources.

18. A system, comprising:
one or more electronic processors; and
a first set of computer-executable instructions stored in a non-transitory computer-readable medium, that when executed by the one or more electronic processors cause the system to
  access a data structure, the data structure including a set of nodes and a set of edges, wherein each edge in the set of edges connects a node in the set of nodes to one or more other nodes, and further, wherein each node represents one of a topic of a study, a variable found to be statistically associated with the topic, or a topic found to be statistically or semantically associated with the topic, and each edge represents a statistical association between a node and the topic or between a first node and a second node;
  traverse the data structure;
  store data and information found during the traversal, the stored data and information associated with one or more nodes or edges of the data structure;
  process the stored data and information in accordance with a second set of computer-executable instructions, wherein when executed the second set of instructions cause the system to perform one or more of
    calculate a statistical metric based on aggregating the data or information associated with multiple nodes or edges;
    perform an analysis of a network comprising the nodes and edges;
    train a machine learning model using a dataset associated with one or more of the nodes;
    aggregate the data or information from multiple nodes or edges and use the aggregation as an input to a trained model; or
    generate a visualization based on a result of executing the second set of instructions.
19. The system of clause 18, wherein the visualization includes multiple layers, with a layer corresponding to topics, variables, and data.
20. The system of clause 18, wherein performing an analysis of a network comprising the nodes and edges further comprises generating a set of topics impacted by a variable or variables that impact a topic.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

Any of the software components, processes or functions described in this application may be implemented as software code to be executed by a processor using any suitable computer language such as, for example, Python, Java, JavaScript, C++, or Perl using, for example, conventional or object-oriented techniques. The software code may be stored as a series of instructions, or commands in (or on) a non-transitory computer-readable medium, such as a random-access memory (RAM), a read only memory (ROM), a magnetic medium such as a hard-drive, or an optical medium such as a CD-ROM. In this context, a non-transitory computer-readable medium is almost any medium suitable for the storage of data or an instruction set aside from a transitory waveform. Any such computer readable medium may reside on or within a single computational apparatus and may be present on or within different computational apparatuses within a system or network.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a flash memory, a USB flash drive, an external hard disk drive, thumb drive, pen drive, key drive, a High-Density Digital Versatile Disc (HD-DV D) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, can be implemented by computer-executable program instructions. Note that in some embodiments, one or more of the blocks, or stages or steps may not necessarily need to be performed in the order presented or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that can direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description herein uses examples to disclose certain implementations of the disclosed technology, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as being essential to an embodiment of the invention.

As used herein (i.e., the claims, figures, and specification), the term "or" is used inclusively to refer to items in the alternative and in combination.

Different arrangements of the components depicted in the drawings or described above, as well as components and steps not shown or described are possible. Similarly, some features and sub-combinations are useful and may be employed without reference to other features and sub-combinations. Embodiments of the disclosure have been described for illustrative and not restrictive purposes, and alternative embodiments will become apparent to readers of this specification. Accordingly, the disclosed invention is not limited to the embodiments described above or depicted in the drawings, and various embodiments and modifications may be made without departing from the scope of the claims below.

What is claimed is:

1. A computer-executed method, comprising:
accessing data and information for a set of sources, wherein for each source, the data and information are associated with a study;
for each source, processing the accessed data and information to identify a topic of the study, a set of variables considered in the study, and to identify information regarding a statistical association between one or more of the set of variables and the topic of the study or between two or more of the set of variables;
storing the processed data and information for each source in a database, the stored data and information including a reference to a topic of the study described in the source, a reference to each of the set of variables considered in the study, and information regarding a statistical association between one or more of the set of variables and the topic of the study or between two or more of the set of variables;
receiving a user input indicating a topic of interest;
in response to the received user input, generating a feature graph based on the stored data and information, the feature graph including a set of nodes and a set of edges, wherein each edge in the set of edges connects a node in the set of nodes to one or more other nodes, and further, wherein each node represents one of the topic of interest, a variable found to be statistically associated with the topic of interest, or a topic found to be statistically or semantically associated with the topic of interest, and each edge represents a statistical association between a node and the topic of interest or between a first node and a second node;
traversing the generated feature graph;
evaluating the data and information used to generate the feature graph; and
presenting the results of the feature graph traversal and evaluation of the data and information used to generate the feature graph to the user.

2. The method of claim 1, wherein the set of sources includes one or more of journals, publications, published studies or investigations, data collected by an organization, or anecdotal observations.

3. The method of claim 1, wherein for at least one of the set of sources, the method comprises associating a dataset with one of the set of variables or with the topic of the study, the dataset including data demonstrating the statistical association between one or more of the set of variables and the topic of the study or between two or more of the set of variables, or data representing a measure of one or more of the set of variables, and traversing the generated feature graph comprises identifying a dataset or datasets associated with one or more variables that are statistically associated with the topic of interest or are statistically associated with a topic semantically related to the topic of interest.

4. The method of claim 1, wherein processing the accessed data and information for each source further comprises using one or more of optical character recognition, natural language processing techniques, natural language understanding techniques, or trained models to identify and extract information.

5. The method of claim 1, wherein the processed data and information are stored in a partition of the database that is accessible to a specific set of users.

6. The method of claim 1, wherein evaluating the data and information used to generate the feature graph further comprises one or more of filtering, generating a metric reflecting a characteristic of a statistically relevant relationship, applying a threshold value to determine relevance, or generating a set of topics impacted by a variable or variables that impact a topic.

7. The method of claim 6, wherein storing the processed data and information for each source comprises storing metadata regarding the source, the generated feature graph includes the stored metadata, and evaluating the data and information used to generate the feature graph includes evaluating the metadata.

8. The method of claim 1, wherein the results are presented to the user in multiple layers, with a layer corresponding to topics, variables, and data.

9. The method of claim 1, wherein receiving the user input indicating a topic of interest further comprises receiving one or more words in a search area and a selection of an icon associated with a statistical search.

10. The method of claim 1, wherein receiving the user input indicating a topic of interest further comprises receiving one or more control parameters from the user, wherein the control parameters include one or more of a constraint on data, population, quality, methodology, or author of one or more sources.

11. A computer-executed method, comprising:
receiving a user input indicating a topic of interest;
accessing a database containing data and information obtained from processing a set of sources, wherein for each source, the database includes a reference to a topic of a study, a reference to a set of variables considered in the study, and information regarding a statistical association between one or more of the set of variables and the topic of the study or between two or more of the set of variables;
generating a feature graph based on the stored data and information, the feature graph including a set of nodes and a set of edges, wherein each edge in the set of edges connects a node in the set of nodes to one or more other nodes, and further, wherein each node represents one of the topic of interest, a variable found to be statistically associated with the topic of interest, or a topic found to be statistically or semantically associated with the topic of interest, and each edge represents a statistical association between a node and the topic of interest or between a first node and a second node;
traversing the generated feature graph;
evaluating the data and information used to generate the feature graph; and
presenting the results of the feature graph traversal and evaluation of the data and information used to generate the feature graph to the user.

12. The method of claim 11, wherein the set of sources includes one or more of journals, publications, published studies or investigations, data collected by an organization, or anecdotal observations.

13. The method of claim 11, wherein for at least one of the set of sources, the method comprises associating a dataset with one of the set of variables or with the topic of the study, the dataset including data demonstrating the statistical association between one or more of the set of variables and the topic of the study or between two or more of the set of variables, or data representing a measure of one or more of the set of variables, and traversing the generated feature graph comprises identifying a dataset or datasets associated with one or more variables that are statistically associated with the topic of interest or are statistically associated with a topic semantically related to the topic of interest.

14. The method of claim 11, wherein evaluating the data and information used to generate the feature graph further comprises one or more of filtering, generating a metric reflecting a characteristic of a statistically relevant relationship, applying a threshold value to determine relevance, or generating a set of topics impacted by a variable or variables that impact a topic.

15. The method of claim 11, wherein the database includes metadata regarding each source, the generated feature graph includes the stored metadata, and evaluating the data and information used to generate the feature graph includes evaluating the metadata.

16. The method of claim 11, wherein the results are presented to the user in multiple layers, with a layer corresponding to topics, variables, and data.

17. The method of claim 11, wherein receiving the user input indicating a topic of interest further comprises receiving one or more control parameters from the user, wherein the control parameters include one or more of a constraint on data, population, quality, methodology, or author of one or more sources.

18. A system, comprising:
one or more electronic processors; and
a first set of computer-executable instructions stored in a non-transitory computer-readable medium, that when executed by the one or more electronic processors cause the system to
access a data structure, the data structure including a set of nodes and a set of edges, wherein each edge in the set of edges connects a node in the set of nodes to one or more other nodes, and further, wherein each node represents one of a topic of a study, a variable found to be statistically associated with the topic, or a topic found to be statistically or semantically associated with the topic, and each edge represents a statistical association between a node and the topic or between a first node and a second node;
traverse the data structure;
store data and information found during the traversal, the stored data and information associated with one or more nodes or edges of the data structure;
process the stored data and information in accordance with a second set of computer-executable instructions, wherein when executed the second set of instructions cause the system to perform one or more of
calculate a statistical metric based on aggregating the data or information associated with multiple nodes or edges;
perform an analysis of a network comprising the nodes and edges;
train a machine learning model using a dataset associated with one or more of the nodes;
aggregate the data or information from multiple nodes or edges and use the aggregation as an input to a trained model; or
generate a visualization based on a result of executing the second set of instructions.

19. The system of claim 18, wherein the visualization includes multiple layers, with a layer corresponding to topics, variables, and data.

20. The system of claim 18, wherein performing an analysis of a network comprising the nodes and edges further comprises generating a set of topics impacted by a variable or variables that impact a topic.

\* \* \* \* \*